(12) United States Patent
Vesdapunt et al.

(10) Patent No.: US 11,443,484 B2
(45) Date of Patent: Sep. 13, 2022

(54) REINFORCED DIFFERENTIABLE ATTRIBUTE FOR 3D FACE RECONSTRUCTION

(71) Applicant: Microsoft Technology Licensing, LLC, Redmond, WA (US)

(72) Inventors: Noranart Vesdapunt, Bellevue, WA (US); Wenbin Zhu, Bellevue, WA (US); Hsiang-Tao Wu, Sammamish, WA (US); Zeyu Chen, Kirkland, WA (US); Baoyuan Wang, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/930,161

(22) Filed: Jul. 15, 2020

(65) Prior Publication Data

US 2021/0358212 A1 Nov. 18, 2021

Related U.S. Application Data

(60) Provisional application No. 63/025,774, filed on May 15, 2020.

(51) Int. Cl.
*G06T 17/00* (2006.01)
*G06T 17/20* (2006.01)
(Continued)

(52) U.S. Cl.
CPC .............. *G06T 17/20* (2013.01); *G06T 7/50* (2017.01); *G06V 40/166* (2022.01); *G06T 2207/30201* (2013.01)

(58) Field of Classification Search
CPC ........ G06T 17/20; G06T 7/50; G06K 9/00255
See application file for complete search history.

(56) References Cited

U.S. PATENT DOCUMENTS 6,556,196 B1 * 4/2003 Blanz ................. G06K 9/00275
345/419
9,786,084 B1 * 10/2017 Bhat ........................ G06T 7/11
(Continued)

FOREIGN PATENT DOCUMENTS

EP        1039417 A1    9/2000
WO    2018184140 A1   10/2018

OTHER PUBLICATIONS

Bagdanov, et al., "The Florence 2D/3D Hybrid Face Dataset", In Proceedings of the Joint ACM Workshop on Human Gesture and Behavior Understanding, Dec. 1, 2011, pp. 79-80.
(Continued)

*Primary Examiner* — Sarah Lhymn
(74) *Attorney, Agent, or Firm* — NovoTechIP International PLLC

(57) ABSTRACT

Techniques performed by a data processing system for reconstructing a three-dimensional (3D) model of the face of a human subject herein include obtaining source data comprising a two-dimensional (2D) image, three-dimensional (3D) image, or depth information representing a face of a human subject. Reconstructing the 3D model of the face also includes generating a 3D model of the face of the human subject based on the source data by analyzing the source data to produce a coarse 3D model of the face of the human subject, and refining the coarse 3D model through free form deformation to produce a fitted 3D model. The coarse 3D model may be a 3D Morphable Model (3DMM), and the coarse 3D model may be refined through free-form deformation in which the deformation of the mesh is limited by applying an as-rigid-as-possible (ARAP) deformation constraint.

17 Claims, 12 Drawing Sheets

(51) Int. Cl.
G06T 7/50 (2017.01)
G06V 40/16 (2022.01)

(56) References Cited

U.S. PATENT DOCUMENTS

| | | | | |
|---|---|---|---|---|
| 2003/0038798 | A1* | 2/2003 | Besl | G06T 15/205 |
| | | | | 345/420 |
| 2005/0057569 | A1* | 3/2005 | Berger | G06K 9/00315 |
| | | | | 345/473 |
| 2006/0017723 | A1* | 1/2006 | Baran | G06T 17/30 |
| | | | | 345/419 |
| 2006/0122999 | A1* | 6/2006 | Sosnov | G06F 16/5854 |
| 2009/0231334 | A1* | 9/2009 | Chen | G06T 17/205 |
| | | | | 345/420 |
| 2017/0148228 | A1* | 5/2017 | Santhanam | G06F 30/00 |
| 2019/0122411 | A1* | 4/2019 | Sachs | G06T 7/248 |
| 2020/0211206 | A1* | 7/2020 | Wang | G06N 20/00 |
| 2020/0265590 | A1* | 8/2020 | Daniilidis | G06N 3/0454 |
| 2020/0342684 | A1* | 10/2020 | Kinsella | G06F 30/00 |
| 2021/0004976 | A1* | 1/2021 | Guizilini | G06K 9/00201 |
| 2021/0183083 | A1* | 6/2021 | Yan | G06T 7/11 |
| 2021/0264079 | A1* | 8/2021 | Mehr | G06N 3/0454 |
| 2021/0350621 | A1* | 11/2021 | Bailey | G06T 17/20 |

OTHER PUBLICATIONS

Blanz, et al., "A Morphable Model for the Synthesis of 3D Faces", In Proceedings of the 26th Annual Conference on Computer Graphics and Interactive Techniques, Jul. 1, 1999, pp. 187-194.

Blanz, et al., "Face Recognition Based on Fitting a 3D Morphable Model", In Journal of IEEE Transactions on Pattern Analysis and Machine Intelligence, vol. 25, Issue 9, Sep. 8, 2003, pp. 1063-1074.

Booth, et al., "Large Scale 3D Morphable Models", In International Journal of Computer Vision, vol. 126, Issue 2-4, Apr. 8, 2017, pp. 233-254.

Cao, et al., "Displaced Dynamic Expression Regression for Real-Time Facial Tracking and Animation", In ACM Transactions on Graphics, vol. 33, Issue 4, Article 43, Jul. 27, 2014, 10 pages.

Chaudhuri, et al., "Joint Face Detection and Facial Motion Retargeting for Multiple Faces", In Proceedings of the IEEE/CVF Conference on Computer Vision and Pattern Recognition, Jun. 15, 2019, pp. 9711-9720.

Chung, et al., "VoxCeleb2: Deep Speaker Recognition", In Repository of arXiv:1806.05622v1, Jun. 14, 2018, 6 Pages.

Deng, et al., "Accurate 3D Face Reconstruction with Weakly-Supervised Learning: From Single Image to Image Set", In Proceedings of the IEEE/CVF Conference on Computer Vision and Pattern Recognition Workshops, Jun. 16, 2019, pp. 285-295.

Egger, et al., "3D Morphable Face Models—Past, Present, and Future", In Journal of ACM Transactions on Graphics, vol. 39, Issue 5, Article 157, Jun. 2020, 38 Pages.

Egger, Bernhard, "Semantic Morphable Models", In Doctoral Thesis Submitted to University of Basel, Jun. 20, 2017, 119 Pages.

Feng, et al., "Joint 3D Face Reconstruction and Dense Alignment with Position Map Regression Network", In Proceedings of the European Conference on Computer Vision, Sep. 8, 2018, 18 Pages.

Garrido, et al., "Reconstructing Detailed Dynamic Face Geometry from Monocular Video", In Journal of ACM Transactions on Graphics, vol. 32, Issue 6, Nov. 1, 2013, 10 Pages.

Gecer, et al., "GANFIT: Generative Adversarial Network Fitting for High Fidelity 3D Face Reconstruction", In Proceedings of the IEEE/CVF Conference on Computer Vision and Pattern Recognition, Jun. 15, 2019, pp. 1155-1164.

Genova, et al., "Unsupervised Training for 3D Morphable Model Regression", In Proceedings of the IEEE Conference on Computer Vision and Pattern Recognition, Jun. 18, 2018, pp. 8377-8386.

Guler, et al., "DenseReg: Fully Convolutional Dense Shape Regression In-the-Wild", In Proceedings of the IEEE Conference on Computer Vision and Pattern Recognition, Jul. 21, 2017, pp. 6799-6808.

Hu, et al., "Avatar Digitization from a Single Image for Real-Time Rendering", In Journal of ACM Transactions on Graphics, vol. 36, Issue 6, Article 195, Nov. 20, 2017, 14 Pages.

Huynh, et al., "Mesoscopic Facial Geometry Inference Using Deep Neural Networks", In Proceedings of the IEEE/CVF Conference on Computer Vision and Pattern Recognition, Jun. 18, 2018, pp. 8407-8416.

Jackson, et al., "Large Pose 3D Face Reconstruction from a Single Image via Direct Volumetric CNN Regression", In Proceedings of the IEEE International Conference on Computer Vision, Oct. 22, 2017, pp. 1031-1039.

Jiang, et al., "3D Face Reconstruction with Geometry Details from a Single Image", In IEEE Transactions on Image Processing, vol. 27, Issue 10, Oct. 2018, pp. 4756-4770.

Kato, et al., "Neural 3D Mesh Renderer", In Proceedings of the IEEE/CVF Conference on Computer Vision and Pattern Recognition, Jun. 18, 2018, pp. 3907-3916.

Kim, et al., "Deep Video Portraits", In ACM Transactions on Graphics, vol. 37, Issue 4, Article 163, Aug. 2018, 14 Pages.

Li, et al., "Learning a Model of Facial Shape and Expression from 4D Scans", In ACM Transactions on Graphics, vol. 36, Issue 6, Article 194, Nov. 20, 2017, 17 Pages.

Lin, et al., "Face Parsing With RoI Tanh-Warping", In Proceedings of the IEEE/CVF Conference on Computer Vision and Pattern Recognition, Jun. 15, 2019, pp. 5647-5656.

Liu, et al., "Disentangling Features in 3D Face Shapes for Joint Face Reconstruction and Recognition", In Proceedings of the IEEE/CVF Conference on Computer Vision and Pattern Recognition, Jun. 18, 2018, pp. 5216-5225.

Liu, et al., "Face Parsing via Recurrent Propagation", In Repository of arXiv:1708.01936v1, Aug. 6, 2017, 13 Pages.

Liu, et al., "Joint Face Alignment and 3D Face Reconstruction with Application to Face Recognition", In IEEE Transactions on Pattern Analysis and Machine Intelligence, vol. 42, Issue 3, Dec. 10, 2018, 15 Pages.

Liu, et al., "Large-Scale CelebFaces Attributes (CelebA) Dataset", Retrieved from http://mmlab.ie.cuhk.edu.hk/projects/CelebA.html, Retrieved on Jul. 30, 2020, 6 Pages.

Liu, et al., "Soft Rasterizer: A Differentiable Renderer for Image-Based 3D Reasoning", In Proceedings of the IEEE/CVF International Conference on Computer Vision, Oct. 27, 2019, pp. 7707-7716.

Lombardi, et al., "Deep Appearance Models for Face Rendering", In ACM Transactions on Graphics, vol. 37, Issue 4, Article 68, Aug. 2018, 13 Pages.

Loper, et al., "OpenDR: An Approximate Differentiable Renderer", In Proceedings of the European Conference on Computer Vision, Sep. 6, 2014, pp. 154-169.

Nguyen-Phuoc, et al., "RenderNet: A Deep Convolutional Network for Differentiable Rendering from 3D Shapes", In Proceedings of the 32nd Conference on Neural Information Processing Systems, Dec. 2018, 11 Pages.

Paysan, et al., "A 3D Face Model for Pose and Illumination Invariant Face Recognition", In Proceedings of the 6th IEEE International Conference on Advanced Video and Signal Based Surveillance, Sep. 2, 2009, pp. 296-301.

Pumarola, et al., "GANimation: Anatomically-Aware Facial Animation from a Single Image", In Proceedings of the European Conference on Computer Vision, Sep. 8, 2018, 16 Pages.

Romdhani, et al., "Estimating 3D Shape and Texture Using Pixel Intensity, Edges, Specular Highlights, Texture Constraints and a Prior", In Proceedings of the IEEE Computer Society Conference on Computer Vision and Pattern Recognition, vol. 2, Jun. 20, 2005, 8 Pages.

Roth, et al., "Adaptive 3D Face Reconstruction from Unconstrained Photo Collections", In Proceedings of the IEEE Conference on Computer Vision and Pattern Recognition, Jun. 27, 2016, pp. 4197-4206.

Saito, et al., "Real-Time Facial Segmentation and Performance Capture from RGB Input", In Repository of arXiv:1604.02647v1, Apr. 10, 2016, 18 Pages.

Sanyal, et al., "Learning to Regress 3D Face Shape and Expression from an Image Without 3D Supervision", In Proceedings of the

(56) References Cited

OTHER PUBLICATIONS

IEEE/CVF Conference on Computer Vision and Pattern Recognition, Jun. 15, 2019, pp. 7755-7764.

Smith, William A. P., "The Perspective Face Shape Ambiguity", In Book on Perspectives in Shape Analysis, Jan. 2016, 20 Pages.

Sorkine, et al., "As-Rigid-As-Possible Surface Modeling", In Eurographics Symposium on Geometry Processing, vol. 4, Jul. 4, 2007, 8 Pages.

Tewari, et al., "FML: Face Model Learning from Videos", In Proceedings of IEEE/CVF Conference on Computer Vision and Pattern Recognition, Jun. 15, 2019, pp. 10812-10822.

Tewari, et al., "MoFA: Model-based Deep Convolutional Face Autoencoder for Unsupervised Monocular Reconstruction", In Proceedings of the IEEE International Conference on Computer Vision, Oct. 22, 2017, pp. 3735-3744.

Tewari, et al., "Self-Supervised Multi-Level Face Model Learning for Monocular Reconstruction at over 250 Hz", In Proceedings of the IEEE Conference on Computer Vision and Pattern Recognition, Jun. 18, 2018, pp. 2549-2559.

Thies, "Face2Face: Real-Time Face Capture and Reenactment of RGB Videos", In Proceedings of the IEEE Conference on Computer Vision and Pattern Recognition, Jun. 27, 2016, pp. 2387-2395.

Tran, et al., "Extreme 3D Face Reconstruction: Seeing Through Occlusions", In Proceedings of the IEEE/CVF Conference on Computer Vision and Pattern Recognition, Jun. 18, 2018, pp. 3935-3944.

Tran, et al., "On Learning 3D Face Morphable Model from In-the-wild Images", In Proceedings of the IEEE Transactions on Pattern Analysis and Machine Intelligence, Jul. 15, 2019, 14 Pages.

Tran, et al., "Regressing Robust and Discriminative 3D Morphable Models with a very Deep Neural Network", In Proceedings of the IEEE Conference on Computer Vision and Pattern Recognition, Jul. 21, 2017, pp. 1493-1502.

Tran, et al., "Towards High-Fidelity Nonlinear 3D Face Morphable Model", In Proceedings of the IEEE/CVF Conference on Computer Vision and Pattern Recognition, Jun. 15, 2019, pp. 1126-1135.

Vlasic, et al., "Face Transfer with Multilinear Models", In ACM Transactions on Graphics, vol. 24, Issue 3, Jul. 30, 2005, pp. 426-433.

Yi, et al., "MMFace: A Multi-Metric Regression Network for Unconstrained Face Reconstruction", In Proceedings of the IEEE/CVF Conference on Computer Vision and Pattern Recognition, Jun. 15, 2019, pp. 7655-7664.

Yin, et al., "A 3D Facial Expression Database for Facial Behavior Research", In Proceedings of the 7th International Conference on Automatic Face and Gesture Recognition, Apr. 10, 2006, 6 Pages.

Yu, et al., "Learning Dense Facial Correspondences in Unconstrained Images", In Proceedings of the IEEE International Conference on Computer Vision, Oct. 22, 2017, pp. 4733-4742.

Zhu, et al., "Face Alignment Across Large Poses: A 3D Solution", In Proceedings of the IEEE Conference on Computer Vision and Pattern Recognition, Jun. 27, 2016, pp. 146-155.

Zhu, et al., "ReDA:Reinforced Differentiable Attribute for 3D Face Reconstruction", In Proceedings of the IEEE/CVF Conference on Computer Vision and Pattern Recognition, Jun. 2020, pp. 4958-4967.

Zollhofer, et al., "State of the Art on Monocular 3D Face Reconstruction, Tracking, and Applications", In Journal of Computer Graphics Forum, vol. 37, Issue 2, May 22, 2018, 28 Pages.

"International Search Report and Written Openion Issued in PCT Application No. PCT/US21/028259", dated Jul. 8, 2021, 10 Pages.

\* cited by examiner

1100

| Error(mm) | | Attributes | | ReDA Rasterization |
|---|---|---|---|---|
| Mean | SD | Color | Mask | |
| 1.321 | 0.364 | ✓ | | |
| 1.494 | 0.362 | | ✓ | |
| 1.253 | 0.284 | ✓ | ✓ | |
| 1.131 | 0.234 | ✓ | | ✓ |
| 1.097 | 0.160 | | ✓ | ✓ |
| 0.962 | 0.146 | ✓ | ✓ | ✓ |

| Error(mm) | | Attributes | | | Free-form |
|---|---|---|---|---|---|
| Mean | SD | Color | Mask | Depth | |
| 1.546 | 0.384 | ✓ | | | |
| 1.632 | 0.396 | | ✓ | | |
| 1.331 | 0.346 | ✓ | ✓ | | |
| 0.793 | 0.324 | ✓ | | ✓ | |
| 0.858 | 0.331 | | ✓ | ✓ | |
| 0.731 | 0.291 | ✓ | ✓ | ✓ | |
| 0.645 | 0.162 | ✓ | ✓ | ✓ | ✓ |

| Errors(mm) | Pyramid Level(s) | | | | |
|---|---|---|---|---|---|
| | 1 | 2 | 3 | 4 | 6 |
| Mean | 2.059 | 1.940 | 1.669 | 1.357 | 1.331 |
| SD | 0.461 | 0.388 | 0.374 | 0.360 | 0.346 |

FIG. 13

REINFORCED DIFFERENTIABLE ATTRIBUTE FOR 3D FACE RECONSTRUCTION

CROSS-REFERENCE TO RELATED APPLICATION

This application claims the benefit of priority to U.S. Provisional Patent Application No. 63/025,774, filed on May 15, 2020 and entitled "Reinforced Differentiable Attribute for 3D Face Reconstruction," the entirety of which is incorporated by reference herein in its entirety.

BACKGROUND

Three-dimensional ("3D") face shape reconstruction has become an important research topic in both computer vision and graphics literature. Significant progress has been made in the past decade in areas such as face recognition, face reenactment and visual dubbing, and avatar creation and animation. Despite this progress, face reconstruction is still an ill-posed problem for monocular images due to the depth ambiguity and albedo illumination ambiguity. Various techniques have been developed for reconstructing a 3D reconstruction of the shape of a human face from image data. A key challenge is 3D face shape reconstruction is building a correct dense face correspondence between a deformable mesh and a single input image. Conventional approaches to this problem, such as 3D Morphable Models ("3DMM"), provide solutions for recovering 3D facial shape and texture from a single image of a face. 3DMM attempts to infer 3D face shape and texture as well as scene properties such as pose and illumination through a fitting process. However, given the ill-posed nature of the problem of 3D face reconstruction, 3DMM and other such conventional solutions rely on prior knowledge to reduce depth ambiguity when analyzing the input image. Other techniques such as Differentiable Rendering ("DR") have also been used to try to solve the problem of 3D face reconstruction. DR attempts to infer 3D geometry, lighting, materials, and other elements of the scene such that a render may realistically reproduce the observed scene using the information inferred from the image of the scene. However, DR typically requires an extensive amount of training data, which renders this approach impractical in many situations. Thus, there is still significant room for improving the correspondence so that projected face shape better aligns with the regions of a face represented in an image.

SUMMARY

An example data processing system according to the disclosure may include a processor and a computer-readable medium storing executable instructions. The executable instructions include instructions configured to cause the processor to perform operations including obtaining source data comprising a two-dimensional (2D) image, three-dimensional (3D) image, or depth information representing a face of a human subject, and generating a 3D model of the face of the human subject based on the source data by analyzing the source data to produce a coarse 3D model of the face of the human subject and refining the coarse 3D model through free form deformation to produce a fitted 3D model.

An example method performed by a data processing system for generating a model includes obtaining source data comprising a two-dimensional (2D) image, three-dimensional (3D) image, or depth information representing a face of a human subject; and generating a 3D model of the face of the human subject based on the source data by: analyzing the source data to produce a coarse 3D model of the face of the human subject; and refining the coarse 3D model through free form deformation to produce a fitted 3D model.

An example memory device according to the disclosure stores instructions that, when executed on a processor of a data processing system, cause the data processing system to generate a model, by: obtaining source data comprising a two-dimensional (2D) image, three-dimensional (3D) image, or depth information representing a face of a human subject; and generating a 3D model of the face of the human subject based on the source data by analyzing the source data of the face to produce a coarse 3D model of the face of the human subject, and refining the coarse 3D model through free form deformation to produce a fitted 3D model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 11 is a table depicting results of a comparison of the ReDA rasterization to Z-buffer rasterization on a first data set.

FIG. 12 is a table depicting results of a comparison of the ReDA rasterization to Z-buffer rasterization on a second data set.

FIG. 13 is a table depicting results of a comparison of the ReDA rasterization utilizing different numbers of pyramid layers.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for 3D face shape reconstruction are provided. These techniques provide a novel framework for 3D face reconstruction from a monocular source image referred to herein as "Reinforced Differentiable Attributes" or "ReDA." ReDA provides a technical solution to the technical problem of depth ambiguity during 3D face reconstruction from a monocular 2D source image, a 3D image, and/or depth data associated with the face of a human subject. ReDA provides a technical solution to reducing such ambiguities by utilizing attributes beyond just the color attributes used by conventional DR approaches, such as depth attributes and the use of a face parsing mask. A technical benefit of ReDA is a projected face shape that better aligns with the silhouette of each face region, such as the eyes, nose, mouth, cheek, of the face of the human subject in the source image and/or depth data.

The technical solution provided by ReDA also includes improvements to the renderer that permit the renderer to be more differentiable through a set of convolution operations with multiscale kernel sizes. The technical solution provided by ReDA also includes a new free-form deformation layer that sits on top of 3DMM to provide both the prior knowledge and out-of-space modeling. Both improvements may be easily integrated into existing 3D face reconstruction pipelines to provide improved 3D face reconstruction from a monocular image.

Another technical benefit provided by ReDA is that ReDA may significantly reduce the processing resources, network resources, and/or memory resources of the computing device(s) used to perform 3D face construction compared to conventional approaches to 3D face reconstruction. Many of these approaches require an extensive amount of training data for the machine learning models used by these approaches which may consume significant amounts of memory and processor resources to train the models. ReDA eliminates the need to obtain, store, and process such extensive amounts of training data to train the machine learning models used therein. Furthermore, ReDA may also significantly reduce processing resources, network resources, and/or memory resources for additional reasons discussed with respect to the example implementations that follow.

Figure 1A:
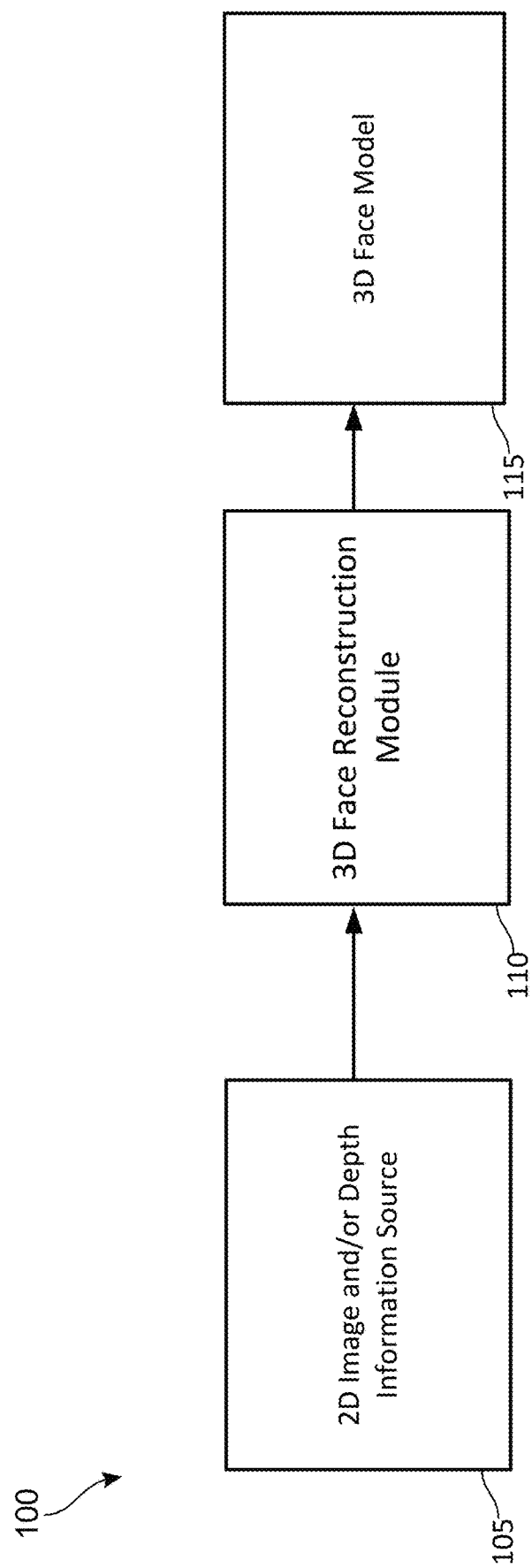
FIGS. 1A and 1B are block diagrams illustrating an example computing environments in which the techniques disclosed herein may be implemented.

FIG. 1A is a diagram of an example computing environment 100, in which aspects of this disclosure may be implemented. The computing environment 100 includes a face data source 105, a 3D face reconstruction module 110, and a 3D face model 115. The face data source 105 may be a monocular camera, a depth camera, or other image capture device associated with the computing device. The face data source 105 may capture a 2D (RGB) image, a 3D (RGB-D) image, and/or depth (D) information associated a face of a human subject for whom a 3D face model representing the geometry of the face of the user represented by the face data obtained from the face data source 105. The depth information may be a point cloud representing a set of data points that represent the geometry of the face of the human subject. The depth information may be a depth map that represents a distance of the surface(s) of the face of the human subject from the camera or other device used to capture the depth map. The depth information may be captured using a camera device that is capable of capturing depth information of a scene. The depth information may be captured using various means, such as a stereoscopic camera, a time-of-flight (ToF)-enabled camera sensor, or other device capable of capturing depth information. In some implementations, the depth information may be captured by an imaging device that is capable of capturing both image and depth data.

The face data source 105 and/or the 3D face reconstruction module 110 may be implemented in one or more computing device(s). The computing device may be a laptop computing device, a personal computing device, a game console, a tablet computing device, a kiosk or point of sale device, a mobile phone or smartphone, a wearable computing device, or other computing device that may implement the 3D face reconstruction techniques disclosed herein. In some implementations, the face data source 105 may be separate from the computing device that implements the 3D face reconstruction module 110, and the face data source 105 may provide a 2D image, 3D image, and/or depth map to the computing device via a wired or wireless connection with the computing device. For example, the face data source 105 may be configured to communicate with the computing device via a Bluetooth connection or via a Universal Serial Bus (USB) connection. Other types of wired and/or wireless connections may be used in addition to or instead of these examples.

The 3D face reconstruction module 110 may be configured to receive a 2D image of a face of a human subject and to generate a 3D model of the face of the human subject based on the 2D image input. The 3D face reconstruction module 110 may be configured to implement ReDA for generating a 3D model of a face from a 2D image of the face disclosed herein. The 3D face reconstruction module 110 may implement at least a part of the 3D face fitting pipeline 500 shown in FIG. 5. The 3D face reconstruction module 110 may output a 3D face model 115 of the face included in the 2D input image.

The 3D face model 115 includes geometric data for a 3D representation of the face of the human subject depicted in the 2D image. The geometric data may represent the shape of the face of the human subject using a polygon mesh. The polygon mesh may define a polyhedral object representing the shape of the face of the human subject. The polygon mesh includes a collection of vertices and edges that connect the vertices. Multiple edges of the mesh are connected to form polygonal faces. The faces may define triangles, quadrilaterals, or other simple convex polygons. The example implementations described herein use triangular faces, but other convex polygonal shapes may also be used.

The 3D face model 115 may be utilized by application on the computing device. The application may be but is not limited to a video game, a 3D modeling application, rendering software for rendering images and/or video of a scene that includes a representation of the human subject whose 2D image was captured, an augmented reality or mixed reality application, a communications platform offering video chat and/or other types of messaging, volumetric capture or holographic capture software, and/or another application in which the 3D model obtained from the 2D image may be utilized. In other implementations, the 3D face model 115 may also be provided to a remote computing device or cloud-based service for use therein as will be described with respect to FIG. 1B.

Figure 1B:
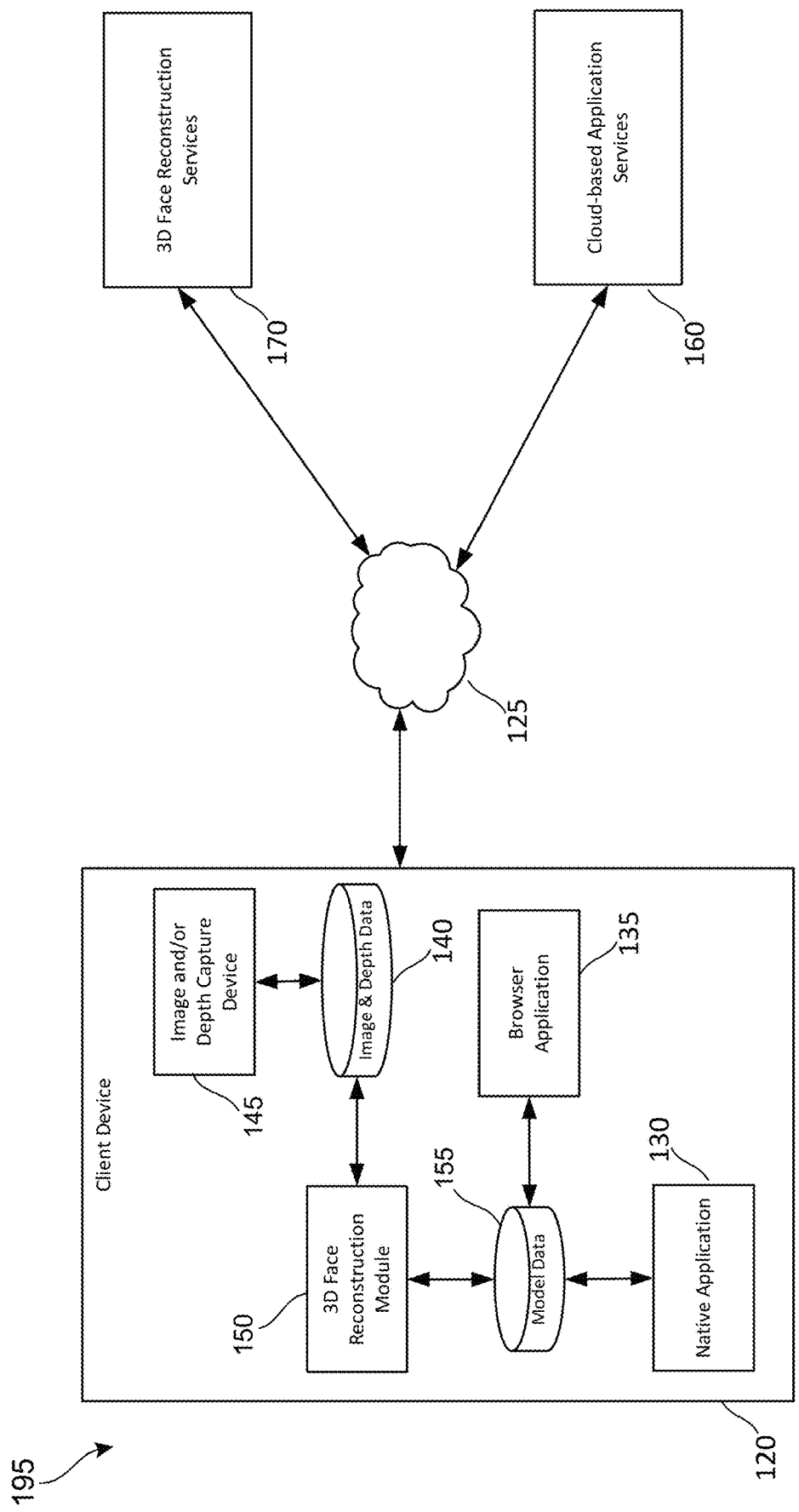

FIG. 1B is a diagram of another example computing environment 195, in which aspects of this disclosure may be implemented. The computing environment 195 includes a client device 120, a network 125, cloud-based application services 160, and 3D face reconstruction services 170.

The client device 120 may include an image and/or depth information capture device 145, an image and depth information datastore 140, a model datastore 155, a 3D face reconstruction module 150, a native application 130, and a browser application 135. The client device 120 may be a laptop computing device, a personal computing device, a game console, a tablet computing device, a kiosk or point of sale device, a mobile phone or smartphone, a wearable computing device, or other computing device that may implement at least a portion of or use the 3D face reconstruction techniques disclosed herein.

The client device 120 may include an image and/or depth information capture device 145 configured to capture a 2D (RGB) image, a 3D (RGB-D) image, and/or depth (D) information associated a face of a human subject for whom a 3D model of their face is to be generated. The image and/or depth information capture device 145 may be a camera and/or cameras built into the client device 120 or may be a camera or cameras connected with the client device 120 via a wired or wireless connection. The image and/or depth information capture device 145 may be configured to capture the 2D (RGB) image, the 3D (RGB-D) image, and/or depth (D) information using an image sensor or sensors and to output the 2D (RGB) image, a 3D (RGB-D) image, and/or a depth (D) information. The image and/or depth information capture device 145 may be configured to capture video content using the image sensor and to output the video content, and a 2D or 3D image of a human subject for whom a 3D face model is to be generated may be extracted from one or more frames of the video content.

The image and/or depth information capture device 145 may output images, depth information, and/or video captured by the image and/or depth information capture device 145 to the image and depth information datastore 140. The image and depth information datastore 140 may be a persist memory of the client device 120 configured to maintain the contents of the memory even if the client device 120 is powered down and/or rebooted. In some implementations, the contents of the image and depth information datastore 140 may be organized as a set of files a by other components of the client device 120. In some implementations, the image and depth information datastore 140 may be implemented as a relational database or other such data store in which the image and/or video data stored there is organized and may be searched by one or more components of the client device 120. Furthermore, the client device 120 may include an image capture application (not shown) that may be used to control the image and/or depth information capture device 145 to capture image and/or video content using the image and/or depth information capture device 145.

The 3D face reconstruction module 150 may be implemented on some client devices 120. 3D face reconstruction module 150 may operate similarly to the 3D face reconstruction module 110 described above with respect to FIG. 1A to implement ReDA. The 3D face reconstruction module 150 may receive a 2D image, a 3D image, and/or depth information associated with a human subject and generate a 3D face model of a subject included in the 2D image using ReDA. The 3D face reconstruction module 150 may store the 3D model in the model datastore 155. The 3D face reconstruction module 150 may include a user interface configured to display a representation of the 3D face model on a display of the client device 120.

The model datastore 155 may be a persist memory of the client device 120 configured to maintain the contents of the memory even if the client device 120 is powered down and/or rebooted. In some implementations, the contents of the model datastore 155 may be organized as a set of files accessible by other components of the client device 120. For example, the 3D models may be organized by the name and/or other identifier associated with the person is the subject of the 3D model. In some implementations, the model datastore 155 may be implemented as a relational database or other such data store in which the model data stored there is organized and may be searched by one or more components of the client device 120.

The 3D face reconstruction services 170 is a cloud-based service accessible via a network 125. The network 125 may comprise one or more public or private networks and may be implemented by the Internet. The 3D face reconstruction services 170 may implement ReDA for generating a 3D face model of a human subject in a 2D image, a 3D image, and/or depth information. A client device, such as the client device 120, may send a request for a 3D face model to the 3D face reconstruction services 170. The request may include a 2D image, a 3D image, and/or depth information of a subject for whom the 3D face model is being requested. The 3D face reconstruction services 170 may generate the requested 3D face model and send the 3D face model to the client device 120 responsive to the request. One or more applications or components of the client device may generate and send the requests for a 3D face model to the 3D face reconstruction services 170, including but not limited to the native application 130, the 3D face reconstruction module 150, and/or the browser application 135. In some implementations, the 3D face reconstruction module 150 of the client device 120 may rely on the 3D face reconstruction services 170 to perform the processing on the 2D image to generate the 3D face model. In such implementations, 3D face reconstruction module 150 may provide an interface for receiving the 2D image, the 3D image, and/or the depth information, for sending the 2D image, the 3D image, and/or the depth information to the 3D face reconstruction services 170, and for receiving the 3D face model from the 3D face reconstruction services 170.

The client device 120 may include a native application 130 developed for use on the client device 120. The native application 130 may be configured for use with an operating system and/or the specific hardware of the client device 120. The native application 130 may be a video game, a 3D modeling application, rendering software for rendering images and/or video of a scene that includes a representation of the human subject whose representation was captured in a 2D image, a 3D image, and/or depth information, an augmented reality or mixed reality application, a communications platform offering video chat and/or other types of messaging, volumetric capture or holographic capture software, and/or another application in which the 3D model may be utilized. In some implementations, the native application

130 may include the functionality of the 3D face reconstruction module 150. In other implementations, the functionality of the 3D reconstruction module 150 may be implemented as a separate application on the client device 120 and/or may be implemented by an operating system of the client device 120. The native application 130 may provide a 2D image, a 3D image, and/or depth information associated with a subject for which a 3D model is desired and the 3D face reconstruction module 150 may output the 3D face model of the subject. The native application 130 may utilize the 3D face model of the user with one or more other models of the subject included in the 2D image to create a full-body model of the subject. The native application 130 may combine the 3D face model with models of other people and/or objects of a scene to be rendered by the native application 130 or into a larger model. The larger model may be rendered by the native application 130 or by another application on the client device or on another computing device.

The cloud-based application services 160 may implement a cloud-based application, such as a video game, a 3D modeling application, rendering software for rendering images and/or video of a scene that includes a representation of the human subject whose representation was captured in a 2D image, a 3D image, and/or depth information, an augmented reality or mixed reality application, an augmented reality or mixed reality application, a communications platform offering video chat and/or other types of messaging, volumetric capture or holographic capture software, and/or another application in which the 3D face model may be utilized. The cloud-based application services 160 may provide software-as-a-service (SaaS) that is accessible over the network 125 from the client device 120. The cloud-based application services 160 may be accessed from a web browser, such as the browser application 135, in some implementations. In other implementations, the cloud-based application services 160 may be accessible via a native application, such as the native application 130, which may be configured to implement a web browser and/or to utilize content provided by the cloud-based application services 160. In some implementations, the cloud-based application services 160 may receive a 2D image, a 3D image, and/or depth information representing a human subject from the client device 120, send the 2D image, the 3D image, and/or the depth information to the 3D face reconstruction services 170, and receive the 3D face model from the 3D face reconstruction services 170 in response to the request. The cloud-based application services 160 may use the 2D image, the 3D image, and/or the depth information and/or the 3D face model of the subject when providing services to a user of the client device 120 and/or other client devices (not shown). Furthermore, the cloud-based application services 160 may utilize the 3D face model of the user with one or more other models of the subject to create a model of the subject and/or models of other people and/or objects of a scene to be rendered by the cloud-based application services 160.

The examples that follow describe various aspects of ReDA. A comparison of the technical benefits of ReDA over conventional 3D face model reconstruction approaches is discussed first. Example implementations ReDA follow the discussion of the benefits of ReDA over conventional approaches to 3D face model reconstruction.

Research into 3D face reconstruction may be divided into separate groups based on the input modality (e.g., RGB inputs which include 2D color information or RGB-D inputs which include depth information in addition to the color information), single view or multi-view, optimization-based or learning-based, the face models used, and different constraints being used. Deep learning-based 3D reconstruction approaches have also been developed that either target only for geometry or for both geometry and texture for monocular input. Most of these conventional approaches attempt to boost the reconstruction accuracy by through the addition of prior knowledge, such as by using a parametric face model, or by adding more constraints, such as sparse landmark loss, perception loss, or photometric loss. ReDA follows the latter approach by adding more constraints by adding more discriminating constraints to reduce ambiguities. ReDA utilizes discriminating constraints that go beyond the color constraint used by conventional approaches to 3D face reconstruction such as 3DMM to provide significant improvements in 3D face reconstruction. Implementations of ReDA may utilize depth constraints and a face parsing mask to provide significant improvements in the resulting 3D face model. Other constraints may be used in addition to and/or instead of one or more of these additional constraints to further improve the resulting 3D face model.

Differential rendering or "DR" as it is referred to herein is an example of one conventional approach that attempts to boost reconstruction accuracy through prior knowledge. DR is a type of reverse rendering of the 3D model from a 2D image and has become widely used in deep learning systems used for face reconstruction. One conventional approach to applying DR to 3D face reconstruction trains a progressive generative adversarial network (GAN) to learn the highly nonlinear texture representation of the face as opposed to using the traditional linear principal component analysis ("PCA") model. This approach may provide high quality results but is impractical in many situations. The GAN requires an extensive amount of training data to properly train the machine learning models used by GAN. For example, a typical implementation may require tens of thousands of high-quality face texture scans to be used as training data for the GAN. Acquiring such an extensive amount of training data is difficult and impractical. In contrast, ReDA relies on additional constraints rather than prior knowledge to avoid the need to obtain such an extensive set of training data.

Many conventional DR implementations also have another significant limitation, which is that these implementations use Z-buffer rasterization which is not truly differentiable. This shortcoming arises because each pixel will be only influenced by the three discrete vertices of its enclosing triangle. An attempt to address this shortcoming of DR with a Soft Rasterizer ("SoftRas") which is fully differentiable. However, while SoftRas has shown impressive results for some 3D objects, SoftRas is not designed for 3D face reconstruction. SoftRas also exhibits several shortcomings that impact the resulting 3D model including: (1) SoftRas uses a single constraint of color, (2) SoftRas uses triangles to perform aggregation across mesh slices, and (3) SoftRas operates on vertex color. ReDA overcomes each of these shortcomings of SoftRas by: (1) operating on additional constraints such as depth and a face parsing mask, (2) using multi-scale convolution operations to perform aggregation across mesh slices, and (3) operating on UV coordinates rather than vertex color. The implementation details associated with each of these improvements is discussed in the examples that follow.

Semantic Face Segmentation is another conventional approach to 3D face reconstruction. One approach to Semantic Face Segmentation proposes a real-time facial segmentation model which masks out occluded facial regions before sending the masked data to a Displaced Dynamic Expression (DDE) tracking model for processing. Another conventional approach to Semantic Face Segmentation leverages a face segmentation model to exclude areas of the face occluded by glasses, hair, and/or the person's hand or hands so that these elements do not contribute to the optimization process. Yet another conventional approach uses segmentation information to assign heuristically defined weights to different facial regions in the reconstruction loss function used in that approach. However, none of the conventional approaches have directly leveraged a face parsing mask to build the dense correspondence and to improve the reconstruction as in ReDA. Details of the usage of the face parsing mask will be described in greater detail in the examples that follow.

Dense Face Correspondence ("DFC") is another conventional technique for obtaining explicit dense correspondence by directly regressing the per-pixel UV position (or equivalent flow). However, the per-pixel ground truth UV in DFC was obtained through 3DMM fitting, which limits the expressiveness space due to the limits of 3DMM capacity. Hence, any dense correspondence regression model trained through such supervised learning would also be limited. ReDA overcomes this capacity limit by adding a free-form deformation layer that can support out-of-space modeling.

A goal of 3D face reconstruction is to build dense correspondence between the 3D face model and the geometry of the face of the human subject included in a 2D image. Many face reconstruction techniques use a deformable mesh to represent the facial features. A significant challenge in 3D face reconstruction is building a dense correspondence between the 2D input image that includes the face and the 3D deformable mesh representing the face in the input image. Conventional approaches to 3D face reconciliation include both implicit and explicit approaches for building dense correspondence. One commonly used implicit approach is the "Analysis-by-Synthesis" approach. The "Analysis-by-Synthesis" approach attempts to minimize the visual differences between an input 2D image and 2D synthesis of an estimated 3D face through a simplified image formulation model. A commonly used explicit approach is to learn the dense correspondence first by directly regressing the per-pixel UV position (or equivalent flow) and fitting the 3D face model afterwards. This explicit approach to 3D face reconciliation uses 3DMM fitting to obtain the ground-truth. The regression model must then be trained through supervised learning. While this approach can provide more accurate 3D reconstruction, training the model through supervised learning may not be practical.

ReDA addresses several fundamental technical problems that have not been addressed by the conventional approaches to 3D face reconstruction discussed above. A first fundamental technical problem overcome by ReDA is that the capacity of the 3DMM significantly limits the representation power to support diverse geometry variations. Some approaches to 3D face reconstruction propose directly learning dense correspondence through UV mapping and claim to be model-free. However, the ground truth space of these approaches is still limited by the capacity of 3DMM. Recently, attempts have been made to represent the geometry in a free-form manner, but ReDA provides better correspondence between the projected face shape and the regions of the face represented in the 2D image by using additional discriminating constraints as discussed in the examples that follow. A second fundamental technical problem solved by ReDA is that the differentiable render used in "Analysis-by-Synthesis" paradigm is not truly "differentiable." Most of the conventional techniques simply use Z-buffer rendering, which is not necessarily differentiable where the nearest vertex indices are changing for each pixel during the optimization. A third fundamental technical problem solved by ReDA is that the expressiveness of the pretrained texture models used by some conventional approaches to 3D face reconstruction were a limiting factor on the correspondence between the projected face shape and the regions of the face represented in the 2D image. If the texture used is overly smooth, the texture will not be useful as a discriminating constraint to drive optimization and correct the correspondence between the projected face shape and the regions of the face represented in the source 2D image of the human subject. For at least these reasons ReDA may significantly improve correspondence between the projected face shape and the regions of the face represented in the source 2D image of the human subject.

Figure 5:
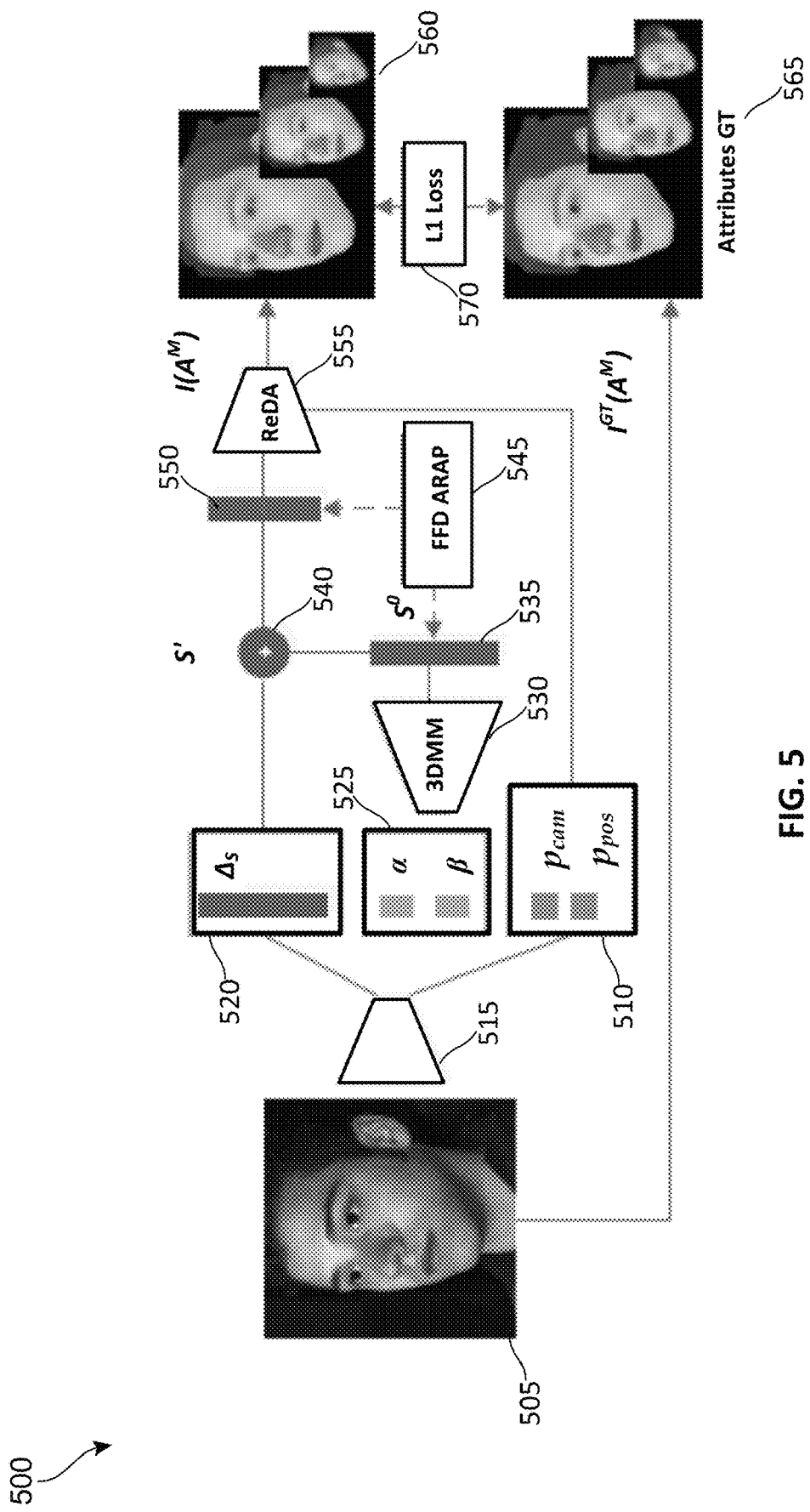
FIG. 5 is a diagram showing an example 3D face fitting pipeline.

ReDA may implement a face fitting pipeline based on the standard "Analysis-by-Synthesis" pipeline, such that for a given input image, the pipeline outputs the parameters of a 3D face model such that a 2D projection of that model matches the input image. The pipeline may be optimized by: (1) replacing differential rendering with Reinforced Differentiable Attribute (ReDA) rendering, and (2) introducing a free-form deformation layer that expands the modeling capacity for better geometry representation. FIG. 5 illustrates an example face fitting pipeline 500 according to these techniques. The elements of the face fitting pipeline 500 will be discussed in greater detail in the examples that follow.

ReDA may also determine photometric loss and 2D landmark loss on a rendered color image generated by the ReDA rasterizer used by the face fitting pipeline 500. The photometric loss and the 2D landmark loss may be used to refine a machine learning model used by the face fitting pipeline 500 to analyze the 2D input images of human subjects. The photometric loss may be determined by measuring the differences between the 2D input image and the 2D projection of the 3D face model, and the 2D landmark loss may be determined by measuring differences between facial landmarks in the input image and the 2D projection. ReDA focuses on obtaining a better face shape using these constraints. A parametric model may be used to represent the base mesh of the face, which may provide a coarse 3D representation of the facial features. A freeform deformation layer may then optimize the per-vertex displacement of the 3D face model after optimizing the parameters of the pretrained face model. To avoid nonsensible displacements, as-rigid-as-possible constraints are added to regularize the deformation between base mesh and the final mesh after adding the displacement during the training. The ReDA module itself includes: (1) a convolution-based soft rasterizer that supports error propagation from one pixel to every vertex (see FIG. 5), and a pipeline that aggregates multiple attributes as constraints to drive the optimization.

ReDA: Reinforced Differentiable Attribute

The examples that follow illustrate various implementation details of ReDA. ReDA provides an optimization framework that steers the mesh deformation toward the correct shape until the final correspondence between the sources image and the 2D projection of the 3D model is achieved. The optimization framework is based on the "Analysis-by-Synthesis" pipeline. Furthermore, ReDA extends the differentiable attributes beyond the color attribute relied upon by conventional differential rendering techniques to include depth and/or face parsing mask attributes. Unless otherwise specified, in the examples that follow, the term $\mathcal{A}$ is used to represent the differentiable attributes, including color ($\mathcal{A}^C$), mask ($\mathcal{A}^M$), and depth ($\mathcal{A}^D$), respectively. The color, mask, and depth attributes may be used together or in subcombinations of these differentiable attributes. $\mathcal{A}$ may be augmented with additional attributes instead of or in addition to one or more of these differentiable attributes.

ReDA may extend the differentiable attributes to include a face parsing mask in the differentiable procedure and using the face parsing mask to drive the correspondence learning. The following examples illustrates how the ReDA can be applied to an input image. For an input image I, the term $\mathcal{A}_I^M$ (I) represents the face parsing output of ReDA and the term $\mathcal{A}_{gt}^M$ (I) represents the face parsing mask ground truth. The ground truth may be obtained by either human annotation or a well-trained face parsing model. The term $\mathcal{M}^{UV}$ represents the mask UV map for the mesh template and which defines the semantic label (i.e., eyebrow, upper lip, or other region of the face) of each vertex of the face parsing mask. When color is used as the differentiable attribute, represented by the term $\mathcal{A}^C$, a corresponding texture UV map $\mathcal{C}^{UV}$ may also be provided. In the follow example, a cylindrical unwrap function $\mathcal{F}$ is used to map a triangle vertex p into the corresponding position in the UV map, where UV(p)= $\mathcal{F}$ (p). For any surface point $V_s$ on the surface of the shape S, the UV coordinates can be determined using the equation:

$$UV(V_s)=(u,v)=\Sigma_{p\in t}\lambda_p \mathcal{F}(p) \quad (1)$$

where t={$p_a, p_b, p_c$} which represents the three vertices of the triangle encloses the point $V_s$ and $\lambda_p$ represents the barycentric coordinates of the vertex p. Where $\mathcal{A}^M$ is used, the mask attribute value $\mathcal{A}_S^M$ (p) for vertex $V_s$ is computed via bi-linear sampling as:

$$\mathcal{A}_S^M(V_s) = \sum_{\substack{u' \in \lfloor \lfloor u \rfloor, \lceil u \rceil \rfloor \\ v' \in \lfloor \lfloor v \rfloor, \lceil v \rceil \rfloor}} (1-|u-u'|)(1-|v-v'|)*M^{UV}(u',v') \quad (2)$$

A rendering pipeline may then be used to convert the per-vertex attribute values on 3D shapes to per-pixel attribute values on 2D images. For example, the ReDA rasterizer pipeline 555 shown in FIG. 5 may be used to render the 2D images based on the 3D shapes and per-pixel attribute values. The term $P_{cam}$ represents the camera projection matrix, and the term $P_{pos}$ represents the pose of the mesh in the camera coordinate system. Assuming that the closest surface point $V_j$ based on the depth value on the shape S maps to the pixel $I^i$ on the 2D image I after rendering, then the corresponding mask value $\mathcal{A}_S^M$ (p) can be computed through the rendering function $\mathcal{R}$:

$$\mathcal{A}_I^M(I^i)=\mathcal{R}(P_{pos},P_{cam},V_j,\mathcal{A}_S^M(V_j)) \quad (3)$$

A process similar to that illustrated in equations 1, 2, and 3 may be applied for other attributes, such as $\mathcal{A}^C$ the term $\mathcal{M}^{UV}$ is replaced with the term $\mathcal{C}^{UV}$ in the UV space. This approach to DR is quite different from conventional approaches in which $\mathcal{R}$ is simply defined as the Z-buffer rendering function, where each pixel $I^i$ is only influenced by the nearest triangle that encloses $V_j$, which is not truly differentiable.

Soft Rasterization via Convolution Kernel

ReDA may utilize a soft rasterization via a convolution kernel to remedy the Z-buffer limitation of Differentiable Rendering. To remedy the Z-buffer limitation of DR, the discrete sampling (through the enclosed triangle) is differentiated into a continuous probabilistic procedure in which each pixel is influenced by all the vertices of the mesh with a corresponding weighted probability. After projection, the closer the pixel is to the projected vertex, the higher the probability that the vertex is influenced. Before projection, the further the distance along the Z (depth) direction, the less the weight should be imposed on the corresponding probability.

Figure 2:
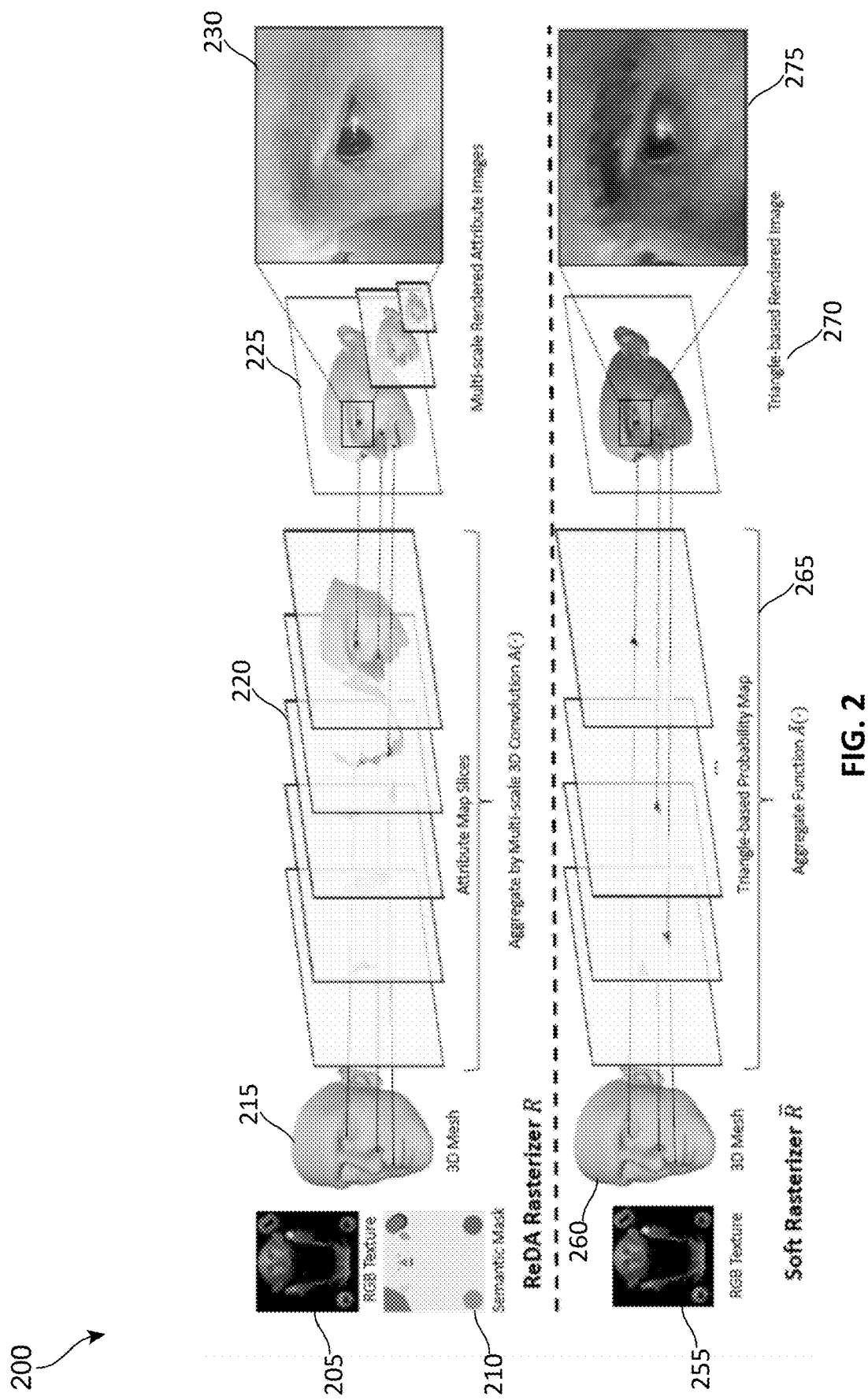
FIG. 2 is a diagram showing a comparison of the ReDA rasterizer and the SoftRas soft rasterizer and a comparison of outputs from both rasterizers.

One way to achieve this is to project each triangle t onto the image plane and to rasterize all the enclosed pixels to get a rendered image. In this way, the triangle t is only influenced by those enclosed pixels and their corresponding attribute (color, mask, or depth) values if the triangle is visible to the camera. To make this "soft" rasterization, a convolutional kernel may be applied to "blur" the rendered image so that the attribute may be propagated outside of the triangle. The term $\mathcal{A}_t^j$ and the term $Z_t^j$ represent the attribute and the Z value, respectively, for each enclosed pixel j with triangle t, and N(t) represents the enclosed pixel set of t, so j∈ $\mathcal{N}$ (t), and where S represents the whole triangle set. The soft rendering results may then be aggregated across all the triangles:

$$\mathcal{A}_I(I^i) = \sum_{t \in S} \sum_{j \in \mathcal{N}(t)} w_j^i \mathcal{A}_t^j \quad (4)$$

where $$w_j^i = \frac{D_j^i \exp(Z_t^j/\gamma)}{\sum_k D_k^i \exp(Z_t^k/\gamma)} \text{ and } D_k^i = \text{Sigmoid}\left(\frac{\|i-k\|_2}{\sigma}\right)(k \in \bigcup_{t=1} \mathcal{N}(t)),$$

and both σ and γ are set $1\times10^{-4}$. Each enclosed pixel attribute value $\mathcal{A}_t^j$ of triangle t is first obtained via per triangle traditional rasterization. The soft rasterization is then implemented as spatial Gaussian filtering operations with varying kernel sizes to help propagate the attribute values outside of the triangle. The softening and aggregation may be performed on a per triangle basis. However, this approach may be too computationally intensive and memory inefficient. Thus, an alternate approach is illustrated in FIG. 2 (described below) in which approximation is performed on mesh slices where all the triangles belonging to the same depth zone are rendered in the same image representing a mesh slice. Aggregation across the mesh slices is then performed to generate a rendered image. In some implementations, the slices are taken along the Z-axis.

Equation 4, shown above, may be implemented as a multi-channel 2D convolution operation, where the kernel size can be varied for different scales of softening. The bigger the kernel size, the broader impact each pixel will have on the other vertices. In some implementations, the same convolution kernel may be stacked a several times with stride 2 to generate a pyramid of rendered attribute images. A photometric like loss may then be applied at each scale of the pyramid between the rendered attribute image and the corresponding ground-truth image (color, mask, or depth).

$$L_{ReDA} = \sum_k \|Pyd(A_I(I),k) - Pyd(A_{gt}(I),k)\|_1 \quad (5)$$

where Pyd is a function returning the k-th scale of the softening version.

FIG. 2 provides a comparison 200 of the ReDA rasterizer described above (shown in the upper portion of the diagram) and the SoftRas soft rasterizer (shown in the lower portion of the diagram). FIG. 2 shows implementation differences between the two rasterization processes and provides a comparison of results provided by each process. The rasterization is performed on mesh slices to provide a less computationally intensive and more memory efficient approach to rasterization than performing the softening and aggregation on all triangles.

In the example shown in FIG. 2, the soft rasterizer receives two inputs: (1) a 3D mesh 260 representing the geometry of the face of a subject, and (2) an RGB texture 255 to be applied to the 3D mesh 260. The soft rasterizer applies an aggregation function to a plurality of per-triangle color based on probability maps 265 and the triangles' relative depths to obtain final rendering results 270. In contrast, the ReDA rasterizer receives three inputs: (1) a 3D mesh 215 representing the geometry of the face of the subject, (2) an RGB texture 205 to be applied to the 3D mesh 215, and (3) a semantic mask 210. The 3D mesh 215 and the 3D mesh 260 represent facial structure the same subject in this example, and the RGB texture 205 and the RGB texture 255 represent the texturing of the face of the same subject as well. The semantic mask 210 (also referred to herein as a "face parsing mask") represents a map for the 3D mesh 215 which defines a semantic label for each vertex. The semantic label may indicate a part of the face with which the vertex is associated, such as but not limited to an eyebrow, nose, upper lip, or other region of the face.

In the ReDA rasterizer, all triangles belonging to the same depth zone may be rendered into the same image, and then be aggregated across different slices 220. For example, the mesh may be sliced along the Z axis into multiple pieces as illustrated in FIG. 2. Rendering results 225 provide an example of the rendering results obtained using the ReDA rasterizer. A comparison of the rendering results 225 and the rendering results 270 shows that the rasterization provided by ReDA rasterizer provides significantly improved results over the soft rasterizer. The magnified portion of the ReDA rasterizer results 230 and the magnified portion of the soft rasterizer results 275 illustrate the improved results that may be provided by the ReDA rasterizer.

Figure 3:
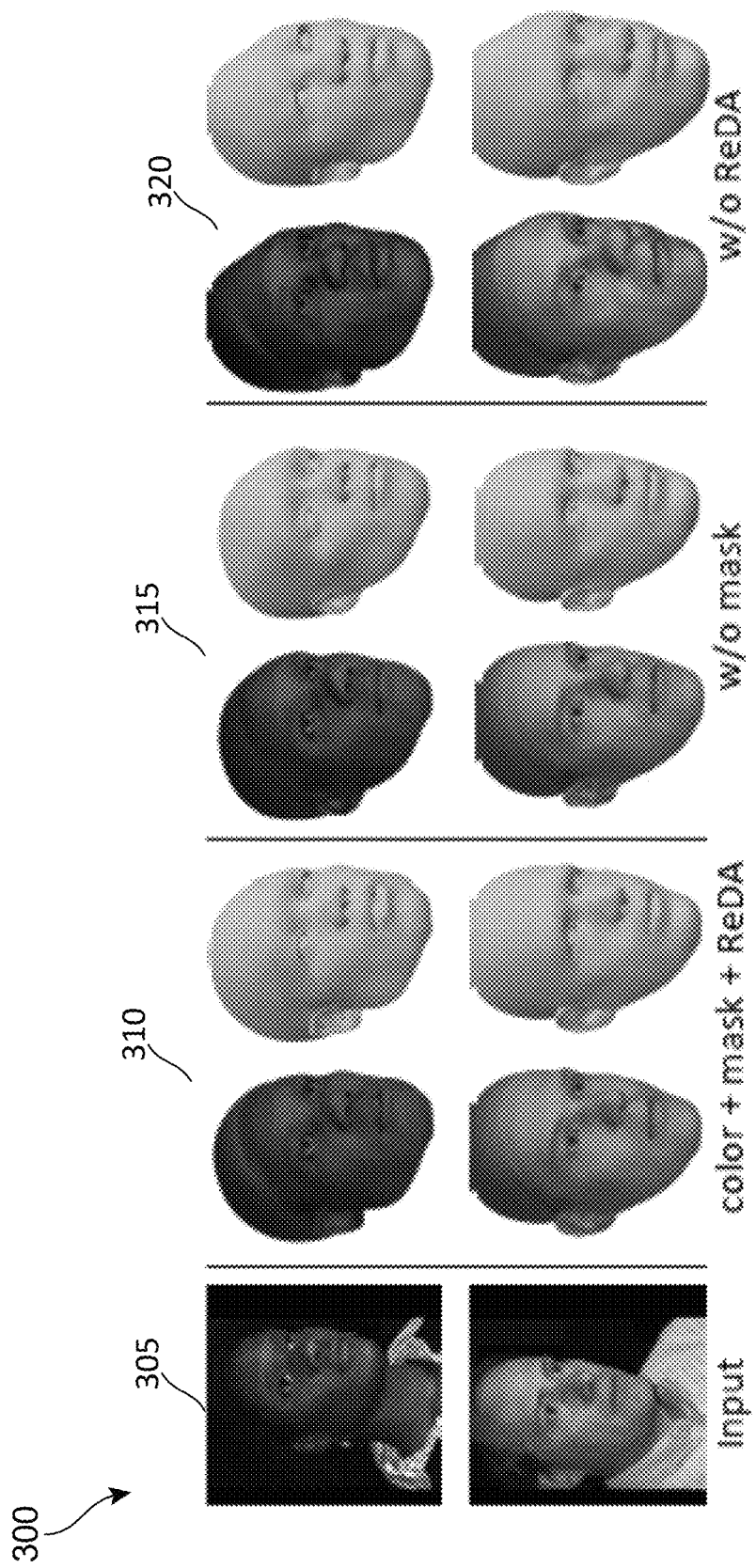
FIG. 3 is a diagram providing a comparison of 3D face reconstruction results with and with ReDA and a mask, without the mask, and without ReDA.

FIG. 3 further illustrates the improved results that may be produced by ReDA. FIG. 3 is a diagram that provides a side-by-side comparison 300 of results produced through Z-buffer rasterization with the continuous probabilistic procedure provided by ReDA. Column 305 of FIG. 3 includes 2D images of two subjects that serve as input images. Column 310 provides example of 3D face shape reconstruction results from rendering each of the subjects using color and a face parsing mask as differentiable attributes when applying ReDA to the input images. Column 315 provides example 3D face shape reconstruction results from rendering each of the subjects using color but not a face parsing mask when applying ReDA to the input images. Column 320 provides an example of 3D face shape reconstruction results from rendering each of the subjects in which ReDA was not applied to the input images. The resulting geometrics of results shown in FIG. 3 demonstrate that applying color and mask as differentiable attributes with ReDA can reduce fitting errors and provide geometries that more closely resemble the subjects in the input images.

Free Form Deformation

ReDA introduces a free-form deformation layer that sits on top of 3DMM to provide additional technical benefits that improve 3D face reconstruction. The free-form deformation layer uses both prior knowledge and out-of-space modeling to significantly improve the 3D face reconstruction results over the use of 3DMM alone. The examples that follow describe a parametric base model that may be used by ReDA and shape correction of the parametric base model through free-form deformation.

Parametric Base Model for Free-Form Deformation

Even though parametric base model, like that provided by 3DMM, has limited modeling capacity, the model still provides decent coarse-scale geometry that represents the shape of the face of the subject in the 2D image. The parametric base model may be further refined through shape-correction as described in the next section. The parametric base model may significantly reduce the burden of learning for the machine learning model. The techniques disclosed herein may use the following parametric face model to represent the basic face shape $S^0(\alpha, \beta)$:

$$S^0(\alpha, \beta) = \overline{S} + \sum_{k_s=1}^{m^s} \alpha_{k_s} B_{k_s}^s \sum_{k_e=1}^{m^e} \beta_{k_e} B_{k_e}^e \quad (6)$$

where $\overline{S} \in R^{3N}$ is the average facial geometry. Matrix $[B_1^S, \ldots, B_{m^s}^S]$ and $[B_1^e, \ldots, B_{m^e}^e]$ respectively represent the shape and expression PCA basis learned from high quality face scans. The number of shape and expression basis are represented by $m^S$ and $m^e$ respectively. For a given face image I, the coefficients $[\alpha_1, \ldots, \alpha_{m^s}]$ and $[\beta_1, \ldots, \beta_{m^e}]$ describe the shape of the face. The reflectance model may be similarly defined.

Shape Correction via Free-Form Deformation

Figure 4:
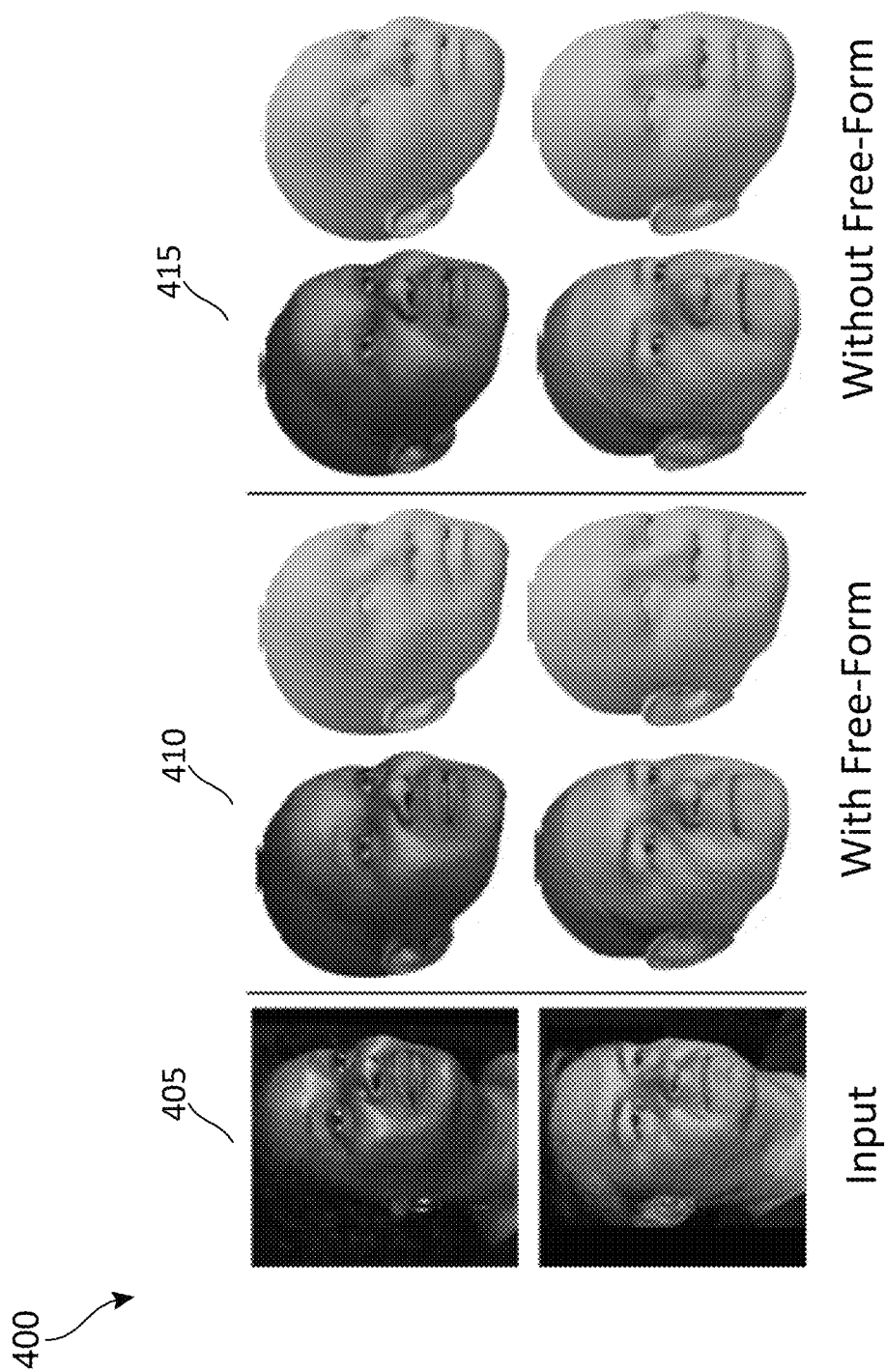
FIG. 4 is a diagram showing a comparison of 3D face reconstruction results with and without the use of free-form deformation.

Free-form deformation may be used to provide improved fitting results that capture finer details in a fitted 3D model than results obtained without the use of free-form deformation. FIG. 4 is a diagram providing a comparison 400 of examples of 3D face fitting results both with and without free-form deformation. The input images for two subjects are in the left-most column 405 of the diagram. The middle column 410 illustrates results using fee-form deformation on the two input images, and the right-most column 415 illustrate results that were generated without free-form deformation being performed on the input images. As can be seen from this example, the use of free-form deformation can significantly improve the geometry details on important face regions to better convey input identity. The example illustrated in FIG. 4 demonstrates that free-form deformation may provide a fitted 3D model with significant improvements in the details around the cheek and mouth regions. Free-form deformation may provide fitted 3D models with improvements in the details of other regions of the face in addition to or instead of the regions discussed in this example.

In contrast with some conventional techniques for 3D face reconstruction that model the correction in parameter space, the techniques disclosed herein directly model the displacement in vertex space. As shown in FIG. 5, the network 515 outputs a corrective shape residual $\Delta_S$ in parallel with the 3DMM parameters. The term S' represents the final deformed mesh, hence $S' = S^0 + \Delta_S$. As discussed above, $S^0$ models the coarse geometry of the face, and $\Delta_S$ models the deformation needed to fill the gap between $S^0$ and the final correct shape S'. As $S^0$ and S' have a natural per-vertex correspondence, the transformation from $S^0$ to $S'$ is referred to herein as free-form deformation.

The techniques disclosed herein use an as-rigid-as-possible (ARAP) deformation constraint with respect to the free-form deformation. Such regularization may be necessary to prevent the mesh from deforming into a nonsensible shape. The ARAP constraint regularizes the deformation. The term $C_l$ represents all the triangles centered at vertex $p_l$, and the term $C'_l$ represents the deformed version. If the deformation is rigid, then there exists a rotation matrix $R_l$ such that:

$$p'_l - p'_m = R_l(p_l - p_m), \forall m \in N(l) \tag{7}$$

For each edge emanating from vertex $p_l(p'_l)$ to its neighbor $p_m(p'_m)$ in the cell, where $N(l)$ denotes the set of vertex indices connected to the vertex $p_l$. In the context of the ARAP constraint, the following loss function is minimized:

$$L(C_l, C'_l) = \sum_{m \in N(l)} w_{lm} \|(p'_l - p'_m) - R_l(p_l - p_m)\| \tag{8}$$

with respect to the whole mesh, the total rigidity may be enhanced by summarizing over the above loss for each cell based on the following:

$$L_{ARAP} = \sum_{l}^{n} w_l \sum_{m \in N(l)} w_{lm} \|(p'_l - p'_m) - R_l(p_l - p_m)\| \tag{9}$$

where both $w_l$ and $w_{lm}$ are set according to the techniques disclosed in "As-rigid-as-possible surface modeling" by Olga Sorkine-Hornung and Marc Alexa, In Symposium on Geometry Processing, 2007, which is incorporated herein by reference. In addition to the above loss, another smooth term is also added to penalize the rotation difference between the two adjacent cells. The final free-form deformation layer minimizes the following losses (referred to as "FFD ARAP" 545 in FIG. 5):

$$L(R, \Delta_s) = L_{ARAP} = \lambda \sum_{l}^{n} \sum_{m \in N(l)} \|(R_l - R_m)\|_2 \tag{10}$$

where R is the set of all $R_l$, $l \in [1, \ldots, n]$. $\lambda$ is set empirically to 0.001 in this example implementation. Each $R_l$ is initialized as the identity matrix, and the process continues with alternating between optimizing $\Delta_s$ while fixing R and optimizing R while fixing $\Delta_s$. At the end, the entire system can be trained end-to-end by combining $L_{DA}$ and $L(R, \Delta_s)$ together with the 2D landmark loss.

FIG. 5 is a diagram of an example 3D face fitting pipeline 500 that may implement the various ReDA techniques disclosed herein. The face fitting pipeline 500 may receive a source data 505 representing the face of a human subject for whom a 3D face model is to be constructed. The source data 505 may be a 2D (RGB) image, a 3D (RGB-D) image, and/or depth (D) information representing the face of a human subject. The network 515 may analyze the source data 505 and output various parameters for various modules of the face fitting pipeline 500. The network 515 may be implemented by various types of machine learning architectures, such as deep neural networks (DNNs), recurrent neural networks (RNNs), convolutional neural networks (CNNs), and/or other types of neural networks.

The network 515 may output the corrective shape with the residual $\Delta_S$ 520 in parallel with 3DMM parameters. The 3DMM parameters the coefficients 525 and the parameters 510. The coefficients 525 describe the shape of the face ($\alpha$) and the skin reflectance ($\beta$) of the subject in the source data 505. The parameters 510 include the $P_{cam}$ representing the camera projection matrix, and the $P_{pos}$ representing the pose of the mesh in the camera coordinate system. The 3DMM module 530 provides the parametric base model) ($S^0$, which models the coarse geometry of the face from the source data 505. $S'$ represents the final deformed mesh in which the mesh is deformed according to the residual $\Delta_S$ 520. The residual $\Delta_S$ 520 models the deformation needed to fill the gap between $S^0$ and the final correct shape $S'$. Therefore, $S' = S^0 + \Delta_S$.

The ReDA rasterization pipeline 555 generates the image(s) 560 which are a 2D representation of the 3D model of the face from the source data 505. The image 560 can be compared with the ground truth masked image 565 to determine the loss function 570. The loss function 570 represents a difference between the ground truth masked image 565 and the output from the ReDA rasterization pipeline 555. FIG. 2 illustrates an example implementation of the ReDA rasterization pipeline 555.

The free-form deformation (FFD) layer includes three elements in this example implementation: the FFD loss module 545, the FFD module 535, FFD module 540, and the FFD module 550. The FFD layer minimizes the free-form deformation loss using the techniques discussed in the preceding examples. Other losses are omitted in FIG. 5 for the sake of clarity but may be included in other implementations for training the elements of the pipeline according to these additional attributes. The FFD loss module 545 may be configured to determine the free-form loss according to equation (10) discussed above. The FFD module 535 sits on top of the 3DMM module 530 and provides out-of-space modeling that ensures that the mesh geometry has enough space to fit any 2D image, 3D image, and/or depth information included in the source data 505. This approach overcomes the capacity limitations of 3DMM by deforming the mesh geometry outside of 3DMM and providing the deformed mesh shape $S'$ to the 3DMM module 530. The FFD module 550 provides the deformed mesh shape $S'$ ReDA rasterization pipeline 555 which generates the image(s) 560 from the fitted model.

Figure 6:
FIG. 6 is a diagram providing a comparison of 3D face reconstruction using ReDA versus RingNet.

FIG. 6 is a diagram illustrating a comparison 600 of the results of the techniques disclosed herein with another 3D face shape reconstruction techniques referred to as "RingNet." RingNet learns to compute 3D face shape from a single image. However, as can be seen in FIG. 6, the ReDA techniques disclosed herein may provide fits that are much closer to the input identities than the results produced by RingNet. The diagram in FIG. 6 includes a row of input images 605. The row of images 605 is analyzed by the techniques disclosed herein and by RingNet. The row of images 610 that illustrate the output of ReDA, and the row of images 615 shows the results obtained from RingNet. The row of images 620 show the results obtained from the techniques disclosed herein from row 610 rendered with 0.7 alpha blending to show the high alignment quality obtained from ReDA.

Figure 7:
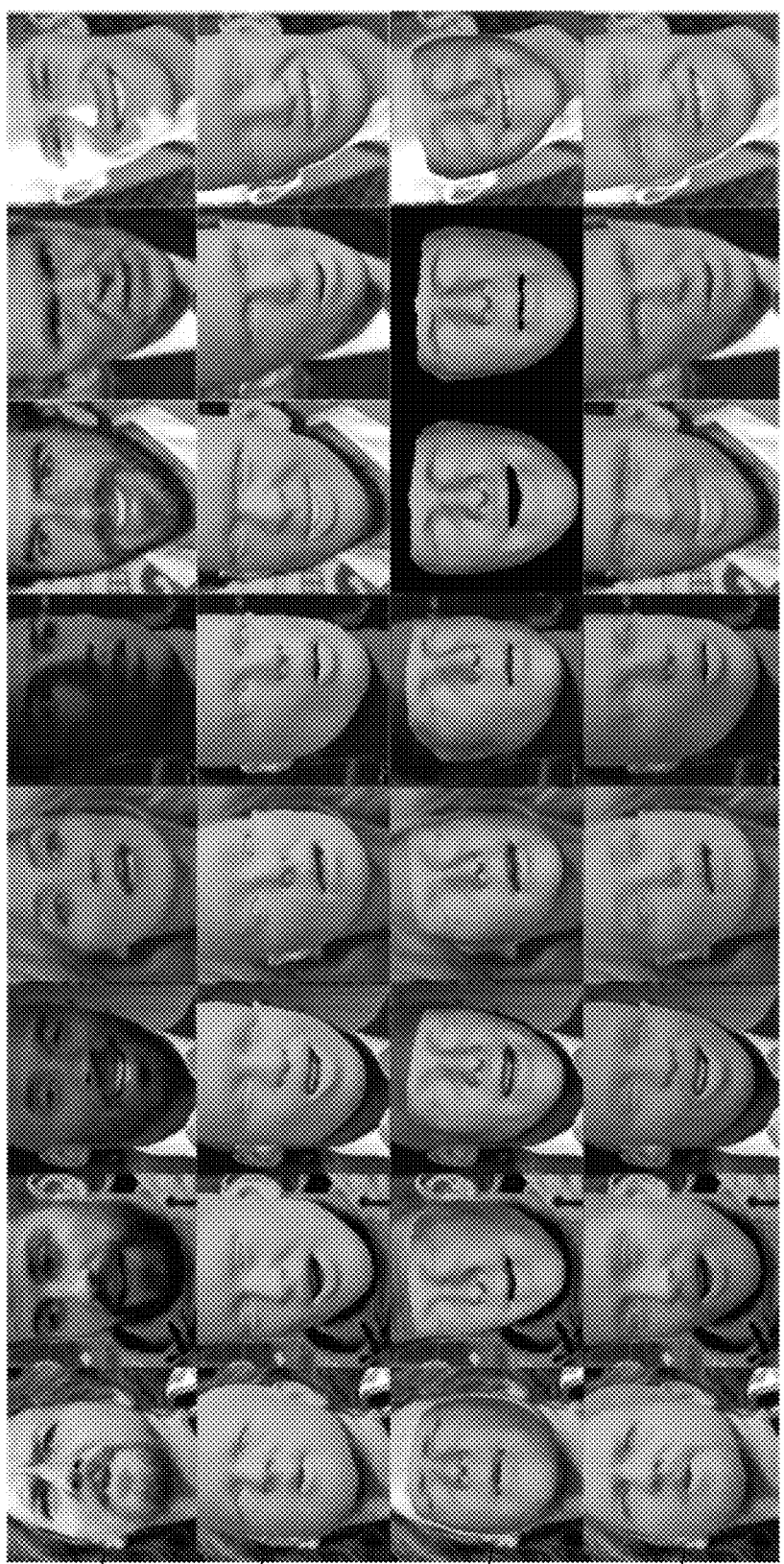
FIG. 7 s a diagram providing a comparison of 3D face reconstruction using ReDA versus Face Model Learning (FML).

FIG. 7 is a diagram illustrating a comparison 700 of the results of the techniques disclosed herein with another 3D face shape reconstruction techniques referred to as Face Model Learning ("FML"). As can be seen in FIG. 7, the ReDA techniques disclosed herein can provide fits that are much closer to the input identities than the results produced by FML. The diagram in FIG. 7 includes a row of input images 705, which are the same input images 605 from FIG. 6. These images are analyzed by the techniques disclosed herein and by FML. The row of image 710 illustrates the output of ReDA, and the row of images 715 illustrates the results obtained from FML. The row of images 720 illustrates the results obtained from ReDA rendered with 0.7 alpha blending to show the high alignment quality obtained from ReDA.

Figure 8:
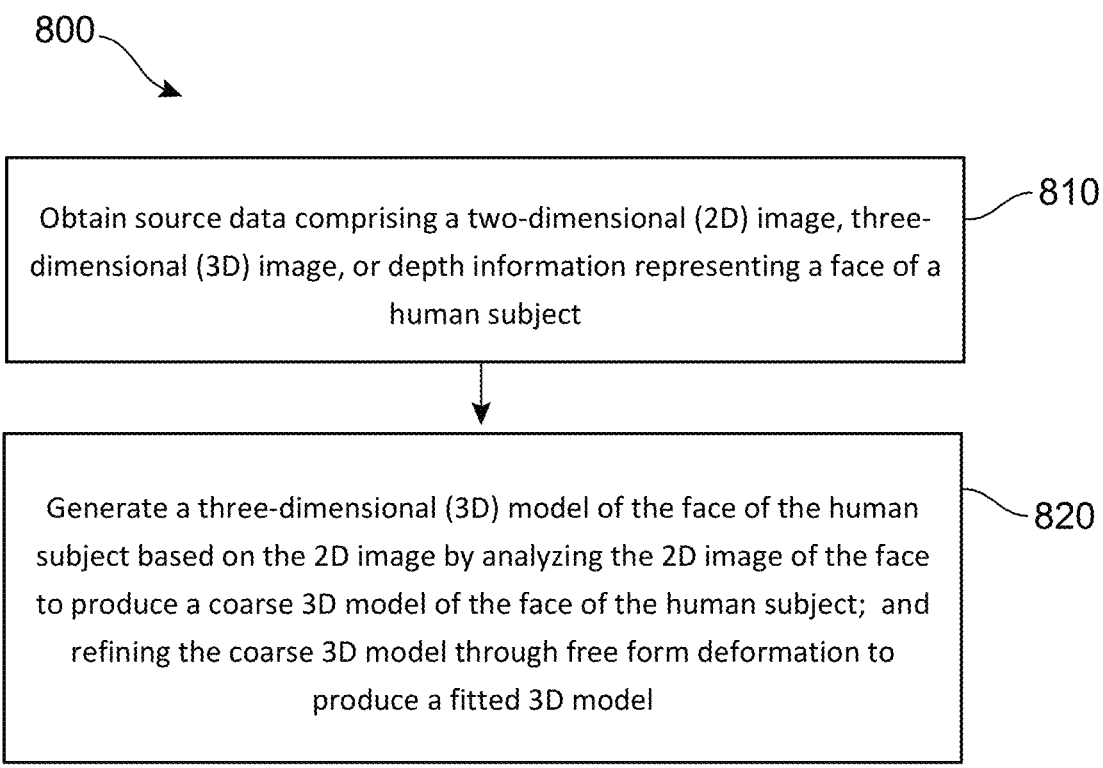
FIG. 8 is a flow chart of an example process for 3D face reconstruction.

FIG. 8 is a flow diagram of a process 800 for generating a 3D model of a face from a 2D image. The process 800 may be implemented on a data processing system, such as the machine 1000 illustrated in FIG. 10. The process 800 may be implemented on a client device, such as the client device 120. The process 800 may also be implemented by 3D face reconstruction services, such as 3D face reconstruction services 170.

The process 800 may include an operation 810 of obtaining a 2D image of a face of a human subject. The 2D image may be obtained from a camera or other image sensor of the device, as discussed with respect to FIGS. 1A and 1B. The 2D image may also be obtained from an external source. For example, the 2D image may be obtained from an image archive, a social media platform, or other source of 2D images. The 2D image may be stored one of many digital image file formats, including but not limited to Joint Photographic Experts Group (JPEG), Graphic interchange Format (GIF), Tagged image File Format (TIFF), Device-Independent Bitmap (DIB), a Bitmap Image File (BMP), Portable Network Graphics (PNG), and/or other digital image file formats. The 2D image may be received over a network, such as the network 125. For example, the client device 120 or the cloud-based application services 160 may send a request to the 3D face reconstruction services 170 for a 3D face model of a subject in the 2D image.

The process 800 may also include an operation 820 of generating a three-dimensional (3D) model of the face of the human subject based on the 2D image by analyzing the 2D image of the face to produce a coarse 3D model of the face of the human subject, and refining the coarse 3D model through free form deformation to produce a fitted 3D model. The operation 820 may be implemented by the face fitting pipeline 500 illustrated in FIG. 5. Various techniques may be used to produce the coarse 3D model of the face of the human subject included in the 2D image. Some implementations may utilize 3DMM to produce a parametric base model (also referred to herein as a "coarse 3D model") that provides coarse-scale geometry of the face of the subject. The coarse 3D model may be refined through free-form deformation to generate the fitted 3D model, and an as-rigid-as-possible (ARAP) deformation constraint to regularize the deformation and to prevent the coarse 3D model from deforming into nonsensible shapes.

ReDA was tested on two datasets: (1) the Media Integration and Communication Center (MICC) dataset, and (2) the 3D Facial Expression Database provided by Binghamton University (BU-3DFE).

The MICC includes scans of 53 subjects. Texture images from frontal pose scans were used for fitting experiments. The texture images in the dataset include both left-side and right-side view. The left-side views were selected for testing, and the scans were cropped at a 95 mm radius around the tip of the nose of the subject included in the selected scans to better evaluate reconstruction of the inner face.

BU-3DFE dataset includes scans of 100 subjects from diverse racial, age and gender groups. Each subject has 25 scans with different expressions. For testing ReDA, scans and images from neutral faces were selected. Furthermore, left-side view texture images were selected for use in testing.

To directly test the effectiveness of ReDA, experiments with the fitting-based method shown in FIG. 5 were used. The pipeline disclosed herein may also be utilized with learning-based methods. The fitting method utilized by ReDA implements stochastic gradient descent (SGD) optimization using the ADAM optimizer. 2D landmark loss is used by default. First, landmark detection is performed which includes the invisible line and face parsing on the input image to extract face landmarks and facial masks. Second, landmark loss is applied to optimize rigid pose Ppose in Equation 4 so that the pose of the template mesh is roughly aligned with the input image. The attribute loss (Equation 5) and landmark loss are applied to jointly optimize rigid pose and other model parameters. Free-form deformation is then performed after optimization of the model parameters.

To measure the error between ground-truth and predictions produced using these techniques, the iterative closest point (ICP) algorithm is applied to automatically find the correspondence between meshes. Point-to-plane errors are then calculated which are measured in millimeters. The results for MICC are listed in Table 1100 of FIG. 11 and the results for BU-3DFE are listed in Table 1200 of FIG. 12. Table 1100 provides results of ablation studies on the MICC dataset in which Z-buffer rasterization was used if ReDA rasterization is not specified. Table 1200 provides result of ablation studies on the BU-3DFE dataset. ReDA rasterization is used by default, and depth ground is assumed to be given where the depth attribute is used.

The effectiveness of Differentiable Attributes was tested by applying photometric loss by enforcing the color consistency between images and the projected color from 3D shapes. 3D shape color was approximated by utilizing a PCA texture model trained from 112 scans with lighting approximated by Spherical Harmonics Illumination. For mask attribute image, a face parsing model was first applied to images to obtain the ground-truth face parsing masks. To enable facial parsing from 3D shapes, UV maps (e.g., the semantic mask 210 of FIG. 2) are painted in which each facial region (e.g., eyes, nose, ears and etc.) is painted with discrete color that corresponds to the ground-truth facial mask labels. Since both color and mask attributes have exact correspondence in UV space, those attributes can be directly rendered as images. For images with depth information, the depth attribute is included in the experiments by default. To add depth attribute in the pipeline, the depth image is rendered for both ground-truth mesh and predicted mesh. The rendered depth image can be consumed in the same way as other attribute images by the pipeline in which the loss between our predicted depth image with the ground-truth depth image is computed. Consistent improvements have been observed as more attributes are combined in the optimization pipeline. As the results in Table 1100 and Table 1200 show, by jointly optimize color and mask attributes, 5:1% and 16:1% relative improvement can be achieved on MICC dataset comparing to optimize color attribute and mask attribute alone and 13:9% and 18:4% on BU-3DFE dataset with the same setting. With additional depth attribute, the fitting error can be further improved by 52:6%, 47:4% and 52:5% comparing to color attribute alone, mask attribute alone color+mask attributes settings, respectively. FIG. 5 shows the effectiveness of our proposed differentiable attributes in ReDA.

The effectiveness of ReDA rasterization was also tested. The ReDA rasterization disclosed herein turns discrete sampling into a continuous probabilistic procedure that a change of one pixel can influence every vertex in a mesh. The ablation study on MICC dataset Table 1200 compares our ReDA rasterization to traditional Z-buffer Rasterization. The results show that such a procedure can effectively reduce the numerical reconstruction error. Consistent improvement on reconstruction error on various of attributes constraints compared to Z-buffer rasterization have also been observed. ReDA rasterization reduces the fitting error on MICC by 14:3%, 26:6% and 23:3% with color, mask, and color+mask settings respectively relative to the Z-buffer rasterization baseline. FIG. 3 also shows the effectiveness by a side-by-side comparison between the ReDA in column 310 and the default Z-buffer rasterization in column 320. One factor that may affect the effectiveness of ReDA rasterization is the number of levels of pyramid layers. The ablation study Table 1300 shows that more levels of pyramid layers can lead to improved performance. Six pyramid layers were used in the ReDA rasterization experiments described herein for testing the effectiveness of ReDA. However, in actual implementations, a greater or fewer number of layers may be used.

The effectiveness of free-form deformation was also tested. To better leverage our image attributes, ARAP free-form deformation is used to ensure that the fitting results are not limited by the capacity of the 3D face model. Free-form deformation is added in the last stage of fitting. Color, face mask, and depth attributes have already been added at this point. The free-form deformation provided a relative improvement of 11.7% on the BU-3DFE dataset. FIG. 4 shows two examples of fitting results between with and without free-form deformation. As shown in FIG. 4, adding the free-form help add more geometry details on the important face regions to better convey the input identity, such as the details around the cheek and mouth.

Quantitatively, due to slight differences in the experimental setup, it may be difficult to compare these tests with the conventional 3D face reconstruction techniques. Nevertheless, the fitting errors may still be compared as a reference. On the MICC dataset, Generative Adversarial Network Fitting for High Fidelity 3D Face Reconstruction or (GAN-Fit) reports historically low fitting error (with mean: 0.94 mm, SD: 0.106 mm) by using a high quality texture (GAN) model trained on a large scale 3D scans. Although the input images are different, ReDA achieves comparable mean point-to-plane error of 0.962 mm with a standard deviation (SD) of 0.146 mm. On BU-3DFE dataset, a comparison is made with FML which is a learning-based method taking multiple RGB images as input. A better result was achieved by ReDA of 1.331 mm mean point-to-plane error with standard deviation of 0:346 mm comparing to their error of 1:78 mm with SD of 0:45 mm. Qualitatively, FIGS. 6 and 7 show that ReDA provided fits much closer to the input identities.

The detailed examples of systems, devices, and techniques described in connection with FIGS. 1-8 and 11-13 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-8 and 11-13 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 9:
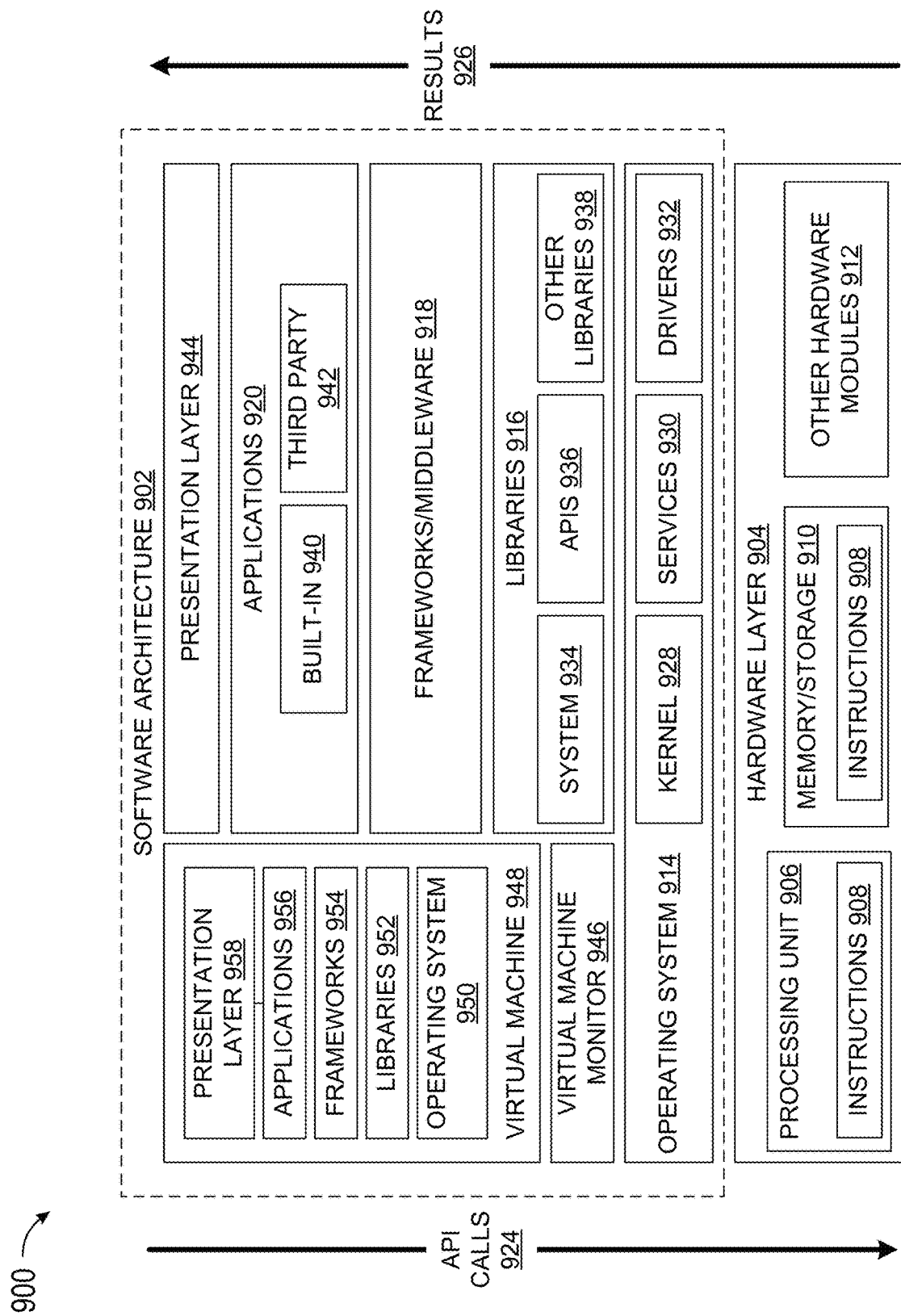
FIG. 9 is a block diagram illustrating an example software architecture, various portions of which may be used in conjunction with various hardware architectures herein described, which may implement any of the features herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an operating system 950, libraries 952, frameworks 954, applications 956, and/or a presentation layer 958.

Figure 10:
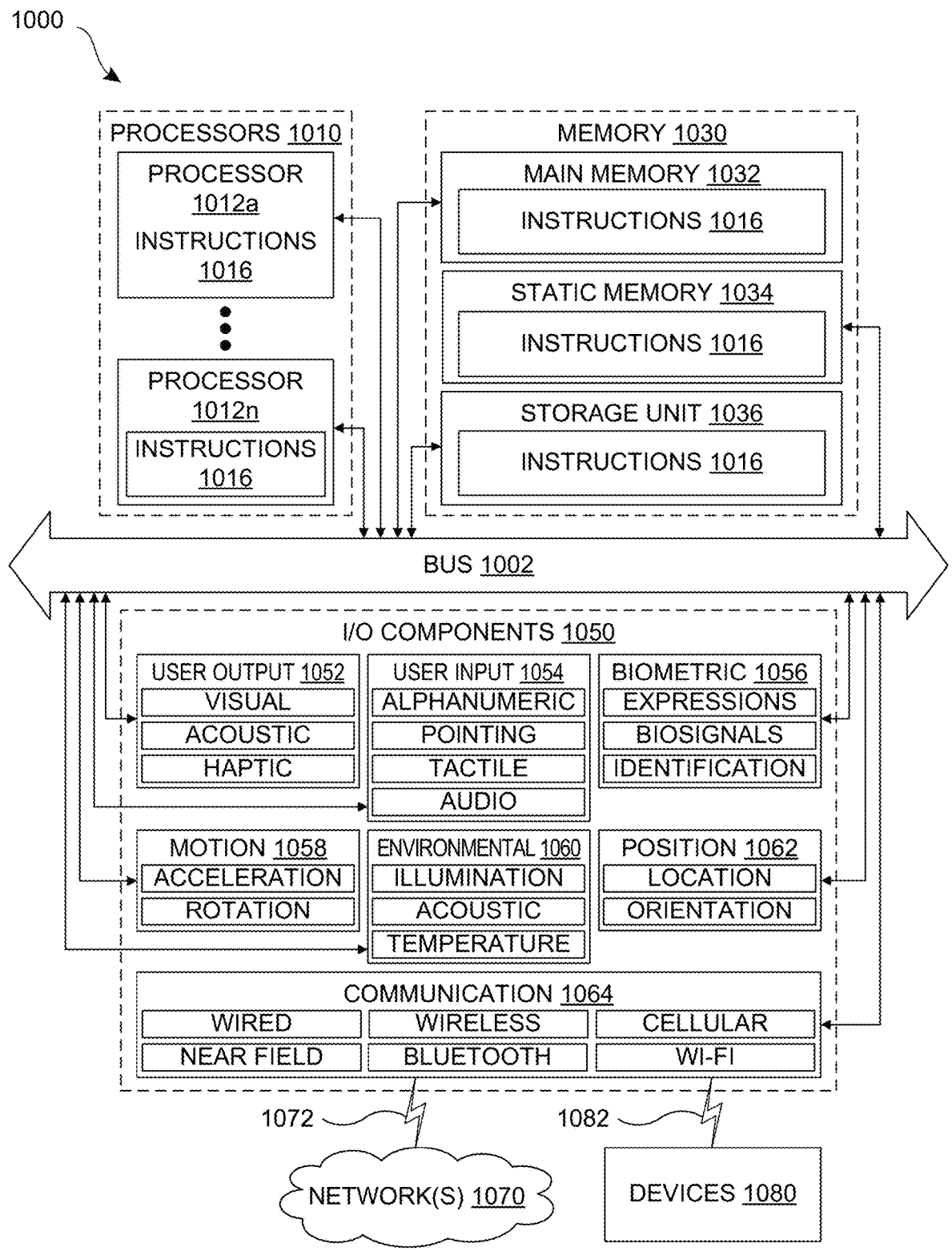
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056, motion components 1058, environmental components 1060, and/or position components 1062, among a wide array of other physical sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1058 may include, for example, acceleration sensors (for example, an accelerometer) and rotation sensors (for example, a gyroscope). The environmental components 1060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions for causing the processor to perform operations of:
      obtaining source data comprising a two-dimensional (2D) image, three-dimensional (3D) image, or depth information representing a face of a human subject;
      analyzing the source data to produce a coarse 3D model of the face of the human subject;
      providing the source data to a neural network trained to analyze the source data and output a corrective shape residual, the corrective shape residual modeling a deformation of a mesh of the coarse 3D model for generating a fitted 3D model;
obtaining the corrective shape residual from the neural network; and
applying free-form deformation to the mesh of the coarse 3D model to refine a shape of the mesh according to the corrective shape residual.

2. The data processing system of claim 1, wherein to analyze the source data to produce the coarse 3D model the computer-readable medium includes instructions configured to cause the processor to perform the operation of:
producing the coarse 3D model of the face using a 3D Morphable Model (3DMM).

3. The data processing system of claim 1, wherein to deform the mesh according to the corrective shape residual the computer-readable medium includes instructions configured to cause the processor to perform the operation of:
limiting the deformation of the mesh by applying an as-rigid-as-possible (ARAP) deformation constraint.

4. The data processing system of claim 1, wherein the computer-readable medium includes executable instructions for causing the processor to perform operations of:
rendering the 2D image from the coarse 3D model using a rendering pipeline that utilizes one or more differentiable attributes that can be used to further refine the coarse 3D model; and
comparing the 2D image to a reference ground-truth image to determine a photometric loss function for further refining the coarse 3D model.

5. The data processing system of claim 4, wherein the one or more differentiable attributes include depth, color, and mask attributes.

6. The data processing system of claim 4, wherein the computer-readable medium includes executable instructions for causing the processor to perform operations of:
rendering the 2D image using a soft rasterization process that applies a convolutional kernel to blur the rendered 2D image to propagate attributes across vertices of the mesh.

7. A method performed by a data processing system for generating a model, the method comprising:
obtaining source data comprising a two-dimensional (2D) image, three-dimensional (3D) image, or depth information representing a face of a human subject;
analyzing the source data to produce a coarse 3D model of the face of the human subject;
providing the source data to a neural network trained to analyze the source data and output a corrective shape residual, the corrective shape residual modeling a deformation of a mesh of the coarse 3D model for generating a fitted 3D model;
obtaining the corrective shape residual from the neural network; and
applying free-form deformation to the mesh of the coarse 3D model to refine a shape of the mesh according to the corrective shape residual.

8. The method of claim 7, wherein analyzing the 2D image of the face to produce the coarse 3D model of the face of the human subject includes producing the coarse 3D model of the face using a 3D Morphable Model (3DMM).

9. The method of claim 7, wherein deforming the mesh according to the corrective shape residual includes limiting the deformation of the mesh by applying an as-rigid-as-possible (ARAP) deformation constraint.

10. The method of claim 7, further comprising:
rendering the 2D image from the coarse 3D model using a rendering pipeline that utilizes one or more differentiable attributes that can be used to further refine the coarse 3D model; and
comparing the 2D image to a reference ground-truth image to determine a photometric loss function for further refining the coarse 3D model.

11. The method of claim 10, wherein the one or more differentiable attributes include depth, color, and mask attributes.

12. The method of claim 10, further comprising:
rendering the 2D image using a soft rasterization process that applies a convolutional kernel to blur the rendered 2D image to propagate attributes across vertices of the mesh.

13. A machine-readable medium storing instructions that, when executed on a processor of a data processing system, cause the data processing system to generate a model, by:
obtaining source data comprising a two-dimensional (2D) image, three-dimensional (3D) image, or depth information representing a face of a human subject;
analyzing the source data of the face to produce a coarse 3D model of the face of the human subject;
providing the source data to a neural network trained to analyze the source data and output a corrective shape residual, the corrective shape residual modeling a deformation of a mesh of the coarse 3D model for generating a fitted 3D model;
obtaining the corrective shape residual from the neural network; and
applying free-form deformation to the mesh of the coarse 3D model to refine a shape of the mesh according to the corrective shape residual.

14. The machine-readable medium of claim 13, wherein to analyze the 2D image of the face to produce the coarse 3D model, the machine-readable medium includes instructions configured to cause the processor to perform an operation of producing the coarse 3D model of the face using a 3D Morphable Model (3DMM).

15. The machine-readable medium of claim 13, wherein to deform the mesh according to the corrective shape residual the machine-readable medium includes instructions configured to cause the processor to perform an operation of limiting the deformation of the mesh by applying an as-rigid-as-possible (ARAP) deformation constraint.

16. The machine-readable medium of claim 13, wherein the machine-readable medium includes executable instructions for causing the processor to perform operations of:
rendering the 2D image from the coarse 3D model using a rendering pipeline that utilizes one or more differentiable attributes that can be used to further refine the coarse 3D model; and
comparing the 2D image to a reference ground-truth image to determine a photometric loss function for further refining the coarse 3D model.

17. The machine-readable medium of claim 16, wherein the machine-readable medium includes executable instructions for causing the processor to perform an operation of rendering the 2D image using a soft rasterization process that applies a convolutional kernel to blur the rendered 2D image to propagate attributes across vertices of the mesh.

* * * * *